(12) United States Patent
Tamura et al.

(10) Patent No.: US 9,294,682 B2
(45) Date of Patent: Mar. 22, 2016

(54) INFORMATION PROCESSING DEVICE, INFORMATION PROCESSING METHOD, AND PROGRAM FOR LIGHT SOURCE ESTIMATION

(71) Applicant: CANON KABUSHIKI KAISHA, Tokyo (JP)

(72) Inventors: Nobuhiko Tamura, Tokyo (JP); Hideyasu Tashiro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 13/874,908

(22) Filed: May 1, 2013

(65) Prior Publication Data
US 2013/0300899 A1    Nov. 14, 2013

(30) Foreign Application Priority Data

May 10, 2012 (JP) .................................. 2012-108822
Feb. 7, 2013 (JP) .................................. 2013-022565

(51) Int. Cl.
H04N 5/262    (2006.01)
H04N 5/235    (2006.01)
G06T 7/00     (2006.01)
G06T 7/40     (2006.01)

(52) U.S. Cl.
CPC ............ *H04N 5/2351* (2013.01); *G06T 7/0046* (2013.01); *G06T 7/40* (2013.01)

(58) Field of Classification Search
CPC .............................. G06T 15/50; H04N 5/2351
See application file for complete search history.

(56) References Cited

U.S. PATENT DOCUMENTS

| 8,933,965 B2 | 1/2015 | Tomite et al. |
| 2006/0176379 A1* | 8/2006 | Hyodo ........................ 348/223.1 |
| 2008/0024523 A1* | 1/2008 | Tomite et al. ................. 345/632 |
| 2011/0227922 A1* | 9/2011 | Shim ............................ 345/426 |

FOREIGN PATENT DOCUMENTS

| CN | 101115168 A | 1/2008 |
| JP | 2008-033531 A | 2/2008 |
| JP | 2009-165115 A | 7/2009 |

OTHER PUBLICATIONS

Okabe et al., "Spherical Harmonics vs. Haar Wavelets: Basis for Recovering Illumination From Cast Shadows", Proc. IEEE Conf. Computer Vision and Pattern Analysis, (CVPR 04), pp. I-50-I-57, 2004.

Jul. 31, 2015 Chinese Office Action corresponding to foreign counterpart application Chinese Patent Application No. 201310170082.X.

Okabe et al., "Spherical Harmonics vs. Haar Wavelets: Basis for Recovering Illumination from Cast Shadows", Proceedings of the 2004 IEEE Computer Society Conference on Computer Vision and Pattern Recognition, 2004, 1-50-I-57, vol. 1.

* cited by examiner

*Primary Examiner* — Gary C Vieaux

(74) *Attorney, Agent, or Firm* — Fitzpatrick, Cella, Harper & Scinto

(57) ABSTRACT

Conventional calculation of light source data requires a high load and is unstable. An information processing device derives light source data which represents a state of a light source of an image represented by a captured image based on image capturing condition data at the time of capturing the image of a subject.

10 Claims, 43 Drawing Sheets

| LONGITUDE φ \ LATITUDE θ | 0° | 45° | 90° |
|---|---|---|---|
| 0° | 0.1 | 0.1 | 1 |
| 90° | 0.1 | 0.1 | 1 |
| 180° | 0.1 | 0.1 | 1 |
| 270° | 0.1 | 0.1 | 1 |

LIGHT SOURCE DATA CORRESPONDING TO WB (CLOUDY)

| LONGITUDE \ LATITUDE | 0° | 45° | 90° |
|---|---|---|---|
| 0° | 1 | 1 | 1 |
| 90° | 1 | 1 | 1 |
| 180° | 1 | 1 | 1 |
| 270° | 1 | 1 | 1 |

FIG.7B

LIGHT SOURCE DATA CORRESPONDING TO WB (SUNLIGHT)

| LONGITUDE \ LATITUDE | 0° | 45° | 90° |
|---|---|---|---|
| 0° | 1 | 0.1 | 1 |
| 90° | 0.1 | 0.1 | 1 |
| 180° | 0.1 | 0.1 | 1 |
| 270° | 0.1 | 0.1 | 1 |

FIG.7C

LIGHT SOURCE DATA CORRESPONDING TO USE OF FLASH

| LONGITUDE \ LATITUDE | 0° | 45° | 90° |
|---|---|---|---|
| 0° | 1 | 0 | 0 |
| 90° | 0 | 0 | 0 |
| 180° | 0 | 0 | 0 |
| 270° | 0 | 0 | 0 |

FIG.7D

LIGHT SOURCE DATA CORRESPONDING TO NIGHT SCENE MODE

| LONGITUDE \ LATITUDE | 0° | 45° | 90° |
|---|---|---|---|
| 0° | 0.4 | 0.2 | 0.2 |
| 90° | 0.4 | 0.2 | 0.2 |
| 180° | 0.4 | 0.2 | 0.2 |
| 270° | 0.4 | 0.2 | 0.2 |

| GPS INFORMATION (LONGITUDE, LATITUDE) | SHOOTING DATE | WB SETTING | ... | LIGHT SOURCE DATA |
|---|---|---|---|---|
| 153° 59' 11" 24° 16' 59" | 2013/11/29 | SUNLIGHT (0) | | 1,0,0,5... |
| 122° 56' 01" 24° 26' 58" | 2012/10/19 | SUNLIGHT (0) | | 1,0,0,5... |
| 136° 04' 11" 20° 25' 31" | 2011/12/31 | CLOUDY (1) | | 1,1,1,1... |
| 148° 45' 14" 45° 33' 28" | 2015/11/24 | INDOOR (2) | | 1,0,0,5... |

FIG.8

CG IMAGE HAVING BEEN SUBJECTED TO RENDERING

LIGHT SOURCE DATA AT THE TIME OF RENDERING

| LONGITUDE \ LATITUDE | 0° | 45° | 90° |
|---|---|---|---|
| 0° | 0 | 0 | 0 |
| 90° | 0 | 1 | 0 |
| 180° | 0 | 0 | 0 |
| 270° | 0 | 0 | 0 |

| GPS INFORMATION (LONGITUDE, LATITUDE) | SHOOTING DATE | WB SETTING | WEATHER | EVALUATION (%) | ... | LIGHT SOURCE DATA |
|---|---|---|---|---|---|---|
| 153° 59' 11" 24° 16' 59" | 2013/11/29 | SUNLIGHT(0) | NOT YET SET(-1) | 60 | | 1,0,0,0.5... |
| 122° 56' 01" 24° 26' 58" | 2012/10/19 | SUNLIGHT(0) | FINE(0) | 80 | | 1,0,0,0.5... |
| 136° 04' 11" 20° 25' 31" | 2011/12/31 | CLOUDY(1) | NOT YET SET(-1) | 70 | | 1,1,1,1... |
| 148° 45' 14" 45° 33' 28" | 2015/11/24 | INDOOR(2) | NOT YET SET(-1) | 90 | | 1,0,0,0.5... |

Columns under brace 1901: WB SETTING, WEATHER
Column under brace 1902: EVALUATION (%)

FIG.19

| GPS INFORMATION (LONGITUDE, LATITUDE) | IMAGE CAPTURING CONDITION DATA | | | LIGHT SOURCE DATA FEATURE QUANTITY | | | LIGHT SOURCE DATA |
|---|---|---|---|---|---|---|---|
| | SHOOTING DATE | WB SETTING | WEATHER | COLOR TEMPERATURE | HISTOGRAM | ... | |
| 153° 59' 11"<br>24° 16' 59" | 2013/11/29 | SUNLIGHT(0) | NOT YET SET(-1) | 6000K | 0,1,0,4,... | | 1,0,0,0,5,... |
| 122° 56' 01"<br>24° 26' 58" | 2012/10/19 | SUNLIGHT(0) | FINE(0) | 5000K | 0,0,0,1,... | | 1,0,0,0,5,... |
| 136° 04' 11"<br>20° 25' 31" | 2011/12/31 | CLOUDY(1) | NOT YET SET(-1) | 5000K | 0,0,0,1,... | | 1,1,1,1,... |
| 148° 45' 14"<br>45° 33' 28" | 2015/11/24 | INDOOR(2) | NOT YET SET(-1) | 3000K | 0,0,0,1,... | | 1,0,0,0,5,... |

FIG.24

INFORMATION PROCESSING DEVICE, INFORMATION PROCESSING METHOD, AND PROGRAM FOR LIGHT SOURCE ESTIMATION

BACKGROUND OF THE INVENTION

1. Field of the Invention

The present invention relates to light source estimation.

2. Description of the Related Art

There is a case where image processing by image processing software etc. is performed in order to give the effect intended by a person who has captured an image to the captured image. For example, mention is made of image processing to change the kind and direction of a light source of the captured image, to synthesize a virtual object, etc. Such image processing has required a skilled person to spend much time to create a processed image without unnaturalness, however, it has been made possible to automatically perform image processing based on information, such as a subject shape, texture, a light source in an image capturing scene, etc. Further, various kinds of techniques to estimate such information from a captured image have been proposed.

For example, there is a technique to estimate a light source by arranging a special apparatus, such as a two-dimensional marker provided with a specular sphere in an image capturing scene. In this case, it is possible to estimate the light source by performing calculation processing based on the position of a camera and the captured image of the specular sphere from which the light source is reflected. However, it is necessary to provide the special apparatus as described above and to capture an image after arranging the special apparatus in an image capturing scene, and therefore, there has been such a problem that much effort and time are required. In such circumstances, a method for estimating a light source by acquiring an entire periphery image by a user provided with a head mount display to which a video camera is attached moving about is proposed (Japanese Patent Laid-Open No. 2008-33531).

There is also a technique to compare CG image data obtained by adjusting light source parameters and rendering a subject shape under various kinds of light source on condition that the shape and texture of the subject be already known, and actually photographed image data, and to estimate a light source by which a difference therebetween is the smallest as a light source in the real scene (Takahiro Okabe, "Spherical harmonics vs. Haar wavelets: basis for recovering illumination from cast shadows" Proc. IEEE Conf. Computer Vision and Pattern Analysis (CVPR 04), pp. I-50-57, 2004, hereinafter referred to as "Okabe").

With the method for estimating the light source according to Japanese Patent Laid-Open No. 2008-33531, it is necessary for the user to move in the entire periphery direction in order to acquire the entire periphery image, and therefor, it is not possible to easily perform the method.

Further, in the case where the method for estimating the light source by Okabe is used, the number of light source parameters is large, therefore, there has been such a problem that optimization takes much time. Furthermore, there has been such a problem that the light source parameter results in a local solution, thereby the processing becomes unstable, as is known generally in the optimization question, in the case where the difference between the CG image and the actually photographed image is minimized.

SUMMARY OF THE INVENTION

An information processing device according to the present invention includes an image capturing condition data acquiring unit configured to acquire capturing an image condition data at the time of image capturing of a subject and a light source data deriving unit configured to derive light source data which represents a state of a light source of the image represented by the data of the captured image based on the image capturing condition data.

It is possible to estimate a light source in a real scene from captured image data easily, efficiently, and stably.

Further features of the present invention will become apparent from the following description of exemplary embodiments (with reference to the attached drawings).

BRIEF DESCRIPTION OF THE DRAWINGS

FIG. 4 is a diagram showing an example of light source data;

FIGS. 7A to 7D are diagrams showing examples of light source data corresponding to image capturing condition data different from one another;

FIG. 8 is a diagram showing an example of a light source data table;

FIG. 19 is a diagram showing an example of a light source data table according to the third embodiment;

FIG. 24 is a diagram showing an example of the light source data table according to the present embodiment;

DESCRIPTION OF THE EMBODIMENTS

Hereinafter, preferred embodiments of the present invention are explained with reference to the attached drawings.

First Embodiment

Device Configuration

Figure 1:
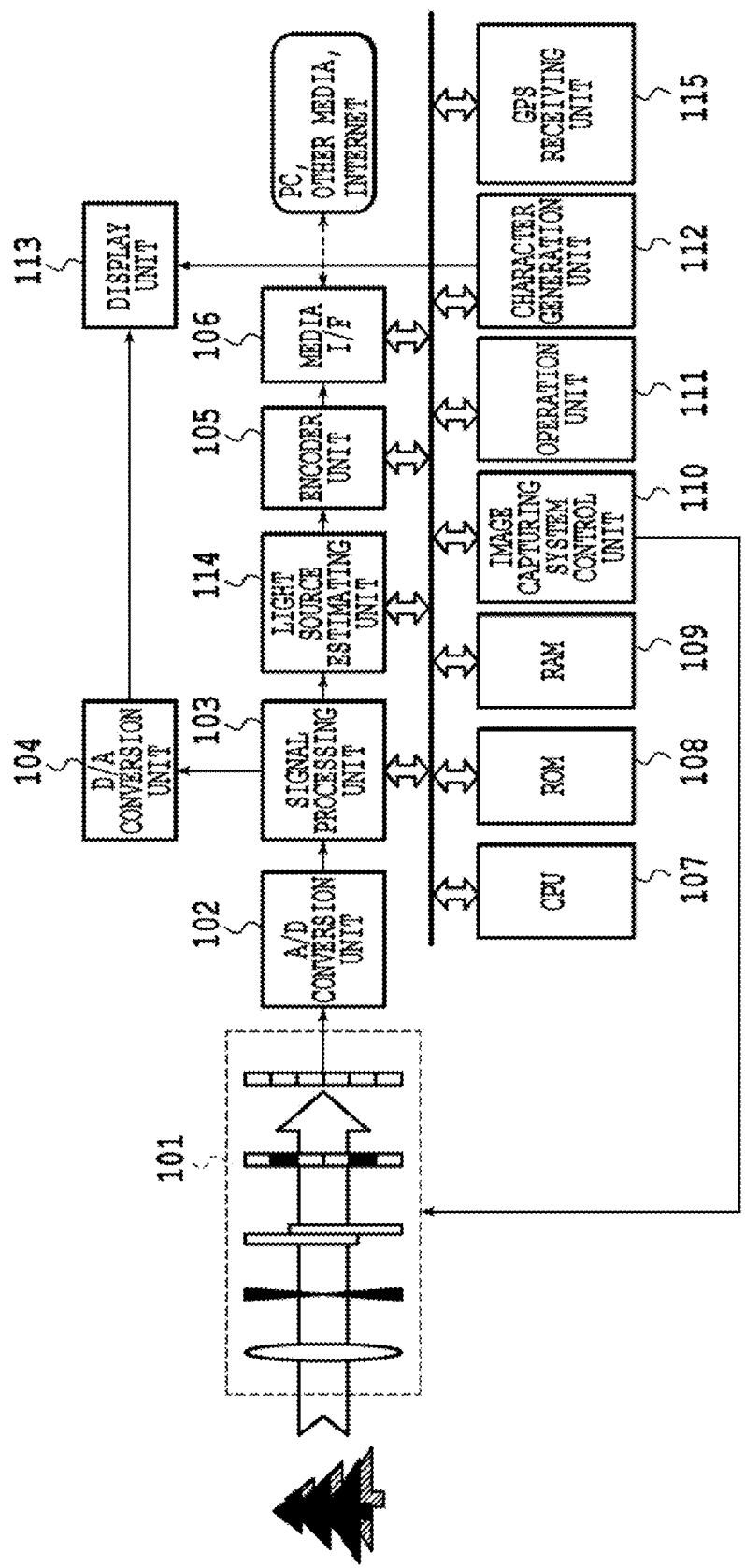
FIG. 1 is a diagram showing an example of a configuration of a camera as an information processing device for performing light source estimation according to a first embodiment.

FIG. 1 is a diagram showing an example of a configuration of a camera as an information processing device for performing light source estimation according to the present embodiment.

An image capturing unit 101 includes a zoom lens, a focus lens, a camera shake correction lens, a diaphragm, a shutter, an optical low-pass filter, an iR cut filter, a color filter, and sensors, such as CMOS and CCD, and detects quantity of light of a subject.

An A/D conversion unit 102 converts the quantity of light of the subject into a digital value.

A signal processing unit 103 performs white balance processing, gamma processing, noise reduction processing, etc. on a converted digital value to generate digital image data.

A D/A conversion unit 104 performs analog conversion on generated digital image data.

An encoder unit 105 performs processing to convert digital image data into a file format, such as Jpeg and Mpeg.

A media interface 106 is an interface configured to connect to a PC and other medium (for example, hard disk, memory card, CF card, SD card, USB memory). Further, the media interface 106 is connected to a communication network, such as the Internet, and performs transmission and reception of data in accordance with the necessity.

A CPU 107 is a processor that totally controls each unit.

A ROM 108 stores a control program etc. executed in the CPU 107.

A RAM 109 functions as a main memory, a work area, etc., of the CPU 107.

An image capturing system control unit 110 performs control of an image capturing system instructed from the CPU 107, such as focusing, releasing of the shutter, and adjustment of the diaphragm.

An operation unit 111 includes a button, a mode dial, etc., and receives user's instructions input therethrough.

A character generation unit 112 generates characters, graphics, etc.

As a display unit 113, generally, a liquid crystal display is used widely, and the display unit 113 displays captured images and characters received from the character generation unit 112 and the D/A conversion unit 104. Further, it may also be possible for the display unit 113 to have a touch screen function and in such a case, it is also possible to handle user's instructions as an input of the operation unit 111.

A light source estimating unit 114 performs light source estimation processing from digital image data. Details of the light source estimating unit 114 will be described later.

A GPS receiver 115 acquires image capturing position data and supplies the data to the light source estimating unit 114 and the encoder unit 105. Further, it is desirable for the GPS receiver 115 to have a function as an electronic compass configured to acquire the direction of a camera.

There are components of a camera other than those described above, however, they are not the main target of the present embodiment, therefore explanation thereof is omitted.

Figure 2:
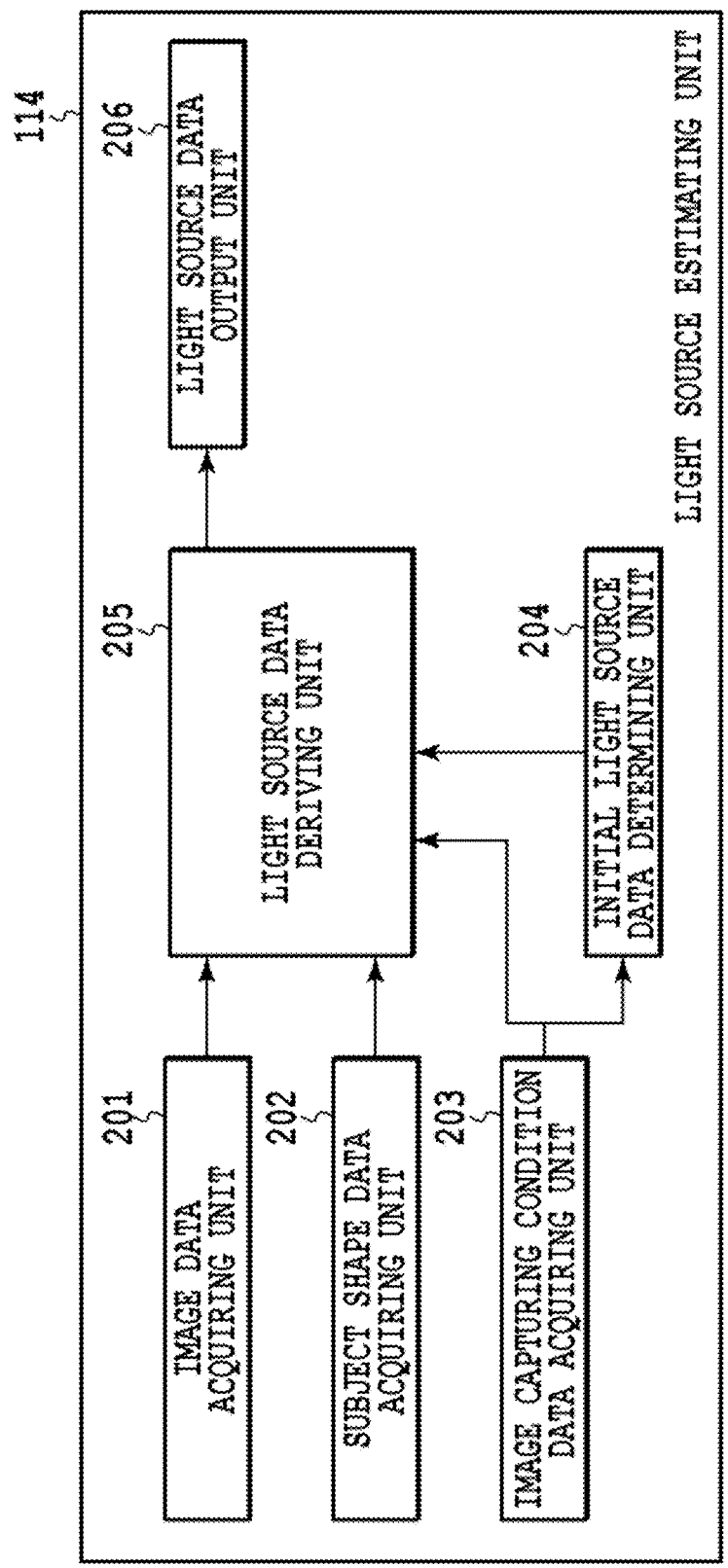
FIG. 2 is a function block diagram showing an internal configuration of a light source estimating unit according to the first embodiment.

FIG. 2 is a function block diagram showing an internal configuration of the light source estimating unit 114 according to the present embodiment.

The light source estimating unit 114 includes an image data acquiring unit 201, a subject shape data acquiring unit 202, an image capturing condition data acquiring unit 203, a light source data deriving unit 205, an initial light source data determining unit 204, and a light source data output unit 206.

The image data acquiring unit 201 acquires digital data of an image (hereinafter, simply referred to as "image data") captured by the image capturing unit 101 and subjected to predetermined image processing from the signal processing unit 103.

The subject shape data acquiring unit 202 acquires shape data of a subject in the image relating to the image data from the ROM 108 etc.

The image capturing condition data acquiring unit 203 acquires data relating to various kinds of condition at the time of image capturing (hereinafter, referred to as "image capturing condition data") from the operation unit 111, the image capturing system control unit 110, the signal processing unit 103, the GPS receiver unit 115, etc. Image capturing condition data includes parameters indicative of a state and circumstances for the camera at the time of image capturing. Specifically, shutter speed, whether or not flash is used, ISO speed, diaphragm stop, white balance (WB), date of image capturing, GPS information, image capturing mode, such as portrait and night scene, comment information, URL information, model type of the camera main body or lens used for image capturing, etc., are included in the image capturing condition data. Preferably, field angle of camera, resolution, position of optical center of camera, vector indicative of optical axis of camera, and information of vector indicative of upward direction of camera are included in the image capturing condition data. This image capturing condition data may be also directly input and set by a user, or may be recorded automatically to a header or a footer of image data at the time of image capturing.

The initial light source data determining unit 204 determines initial light source data corresponding to the image capturing condition data by referring to various types of light source data (stored in the ROM 108 etc. as a light source data storage unit in the state of being associated with image capturing condition data).

Figure 3:
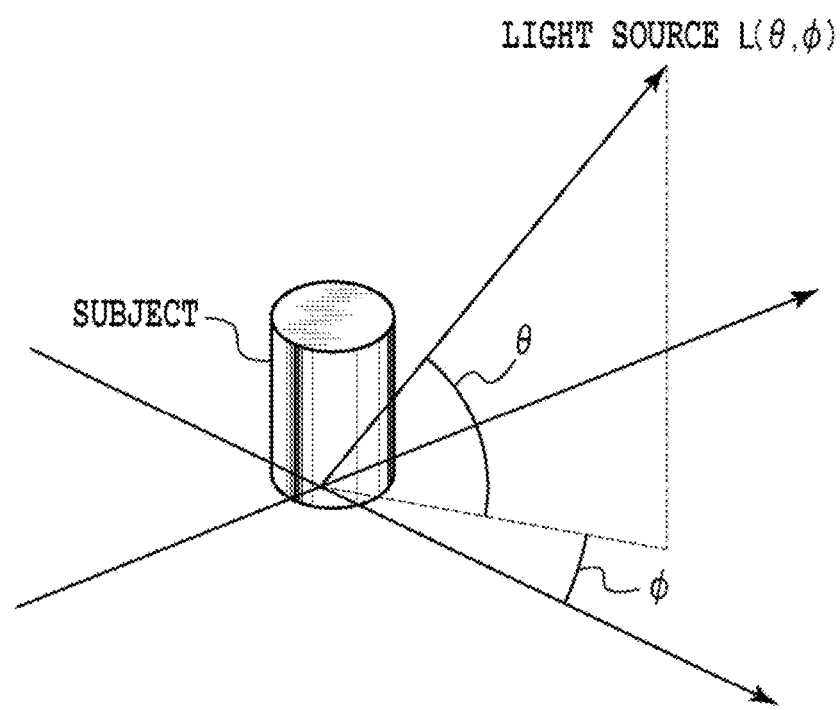
FIG. 3 is a diagram showing a relationship between a light source and a subject.

The light source data deriving unit 205 derives optimum light source data as a light source in a scene from the image data, subject shape data, image capturing condition data, and initial light source data. Here, light source data in the present embodiment is explained. FIG. 3 is a diagram showing a relationship between a light source and a subject. In the present specification, it is assumed that a light source represents a luminance distribution for each incidence direction with respect to light incident on a subject. The incidence direction is represented by a latitude θ and a longitude φ. FIG. 4 is a diagram showing an example of light source data. In the example in FIG. 4, the row represents the longitude and the column represents the latitude, and numerical values (0.0 to 1.0) indicative of luminance for each incidence direction of light incident on a subject are shown. Such light source data in which the values at 90 degrees latitude are extremely large represents a light source from a direction of a high point (that is, light source whose light intensity from the zenith is high). As a scene having such a light source, mention is made of a clear sky in the daytime etc.

The light source data output unit 206 outputs the derived light source data to outside.

Processing in each of the units described above is implemented by the CPU 107 causing various kinds of software (computer program) to run.

Figure 5:
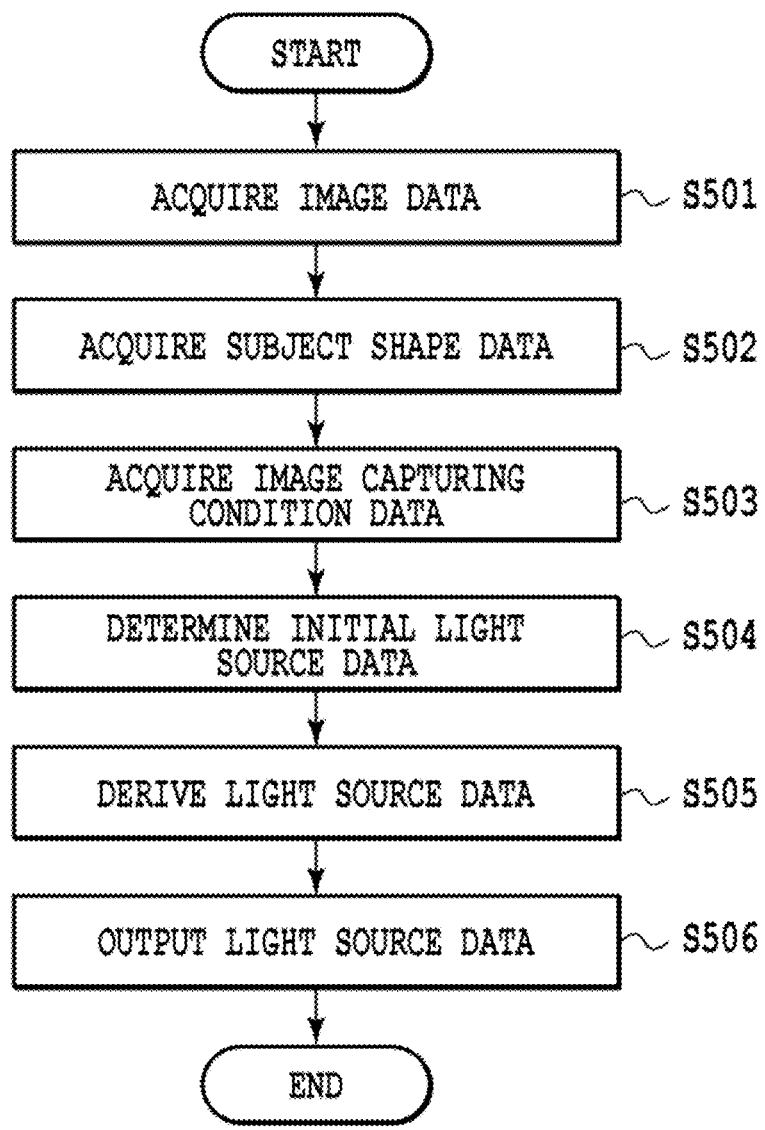
FIG. 5 is a flowchart showing a flow of light source estimation processing in the first embodiment.

FIG. 5 is a flowchart showing a flow of light source estimation processing in the present embodiment.

At step 501, the image data acquiring unit 201 acquires image data having been subjected to predetermined image processing from the signal processing unit 103. The acquired image data is sent to the light source data deriving unit 205.

Figure 6:
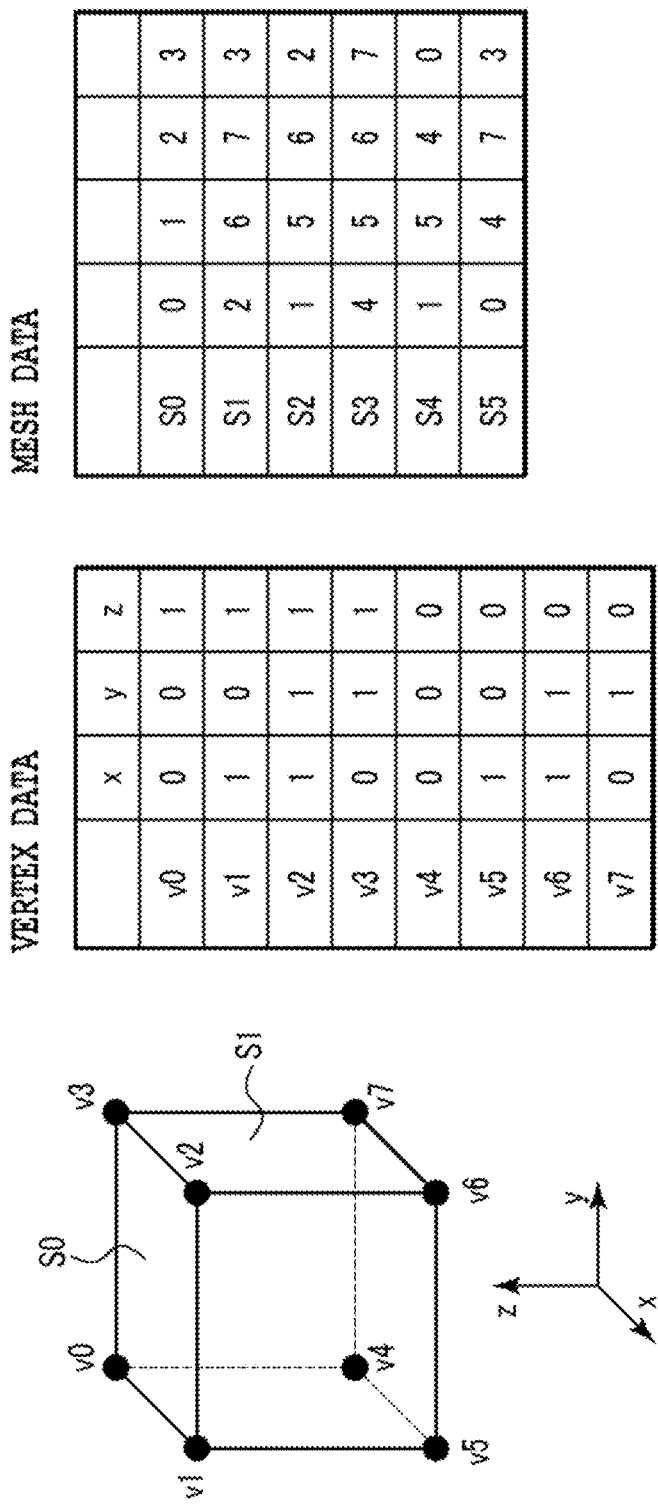
FIG. 6 is a diagram showing an example of polygon data.

At step 502, the subject shape data acquiring unit 202 acquires shape data of a subject. The acquired subject shape data is sent to the light source data deriving unit 205. As subject shape data, polygon data is preferable and data obtained by previously performing measurement using a 3D scanner etc. and stored in the ROM 108 etc. in advance is acquired. Alternatively, it may also be possible to provide a 3D scanner in an information processing device itself and to directly acquire measured polygon data. FIG. 6 shows an example of polygon data acquired at this step, in which polygon data of a cube is shown. As shown in FIG. 6, polygon data includes vertex data and mesh data. In the case where the subject is assumed to be a set of planes, a cube is a set of six planes and has eight vertexes. The vertex data holds a three-dimensional coordinate value of each vertex. The mesh data specifies each plane and describes how to configure a plane by connecting vertexes. For example, a plane S0 in the mesh data in FIG. 6 represents a square plane specified by vertexes v0, v1, v2, and v3. In FIG. 6, a plane is configured by four vertexes; however, it may also be possible to configure a plane by three vertexes or five vertexes. Such polygon data describing shape is acquired as subject shape data.

At step 503, the image capturing condition data acquiring unit 203 acquires image capturing condition data from the operation unit 111 etc. The acquired image capturing condition data is sent to the initial light source data determining unit 204 and the light source data deriving unit 205.

At step 504, the initial light source data determining unit 204 determines initial light source data corresponding to the acquired image capturing condition data by referring to a light source data table stored in the ROM 108 etc.

Here, a light source data table stored in the ROM 108 etc. is explained. In the ROM 108 etc. as a light source data storage unit, a light source data table including a plurality of pieces of light source data associated with the image capturing condition data is held. Then, from the plurality of pieces of light source data, one piece of light source data corresponding to the acquired image capturing condition data is determined as initial light source data. FIGS. 7A to 7D show examples of light source data corresponding to different image capturing condition data, respectively. FIG. 7A is an example of light source data suitable to the case where the setting of white balance is "cloudy". In the case where white balance is "cloudy", it is inferred that the image capturing scene is a cloudy or shady scene, and therefore, the light source at the time of image capturing is uniform in all the directions. Because of this, light source data in which luminance has a uniform value in all the directions is preferable. FIG. 7B is an example of light source data suitable to the case where the setting of white balance is "sunlight". In the case where white balance is "sunlight", it is inferred that the image capturing scene is a clear sky scene. Because of this, light source data in which luminance of light from the zenith direction is high is preferable. In the case where white balance is "sunlight", it is more desirable to predict the accurate direction of the sun based on information, such as GPS information and date of image capturing, and to hold light source data in which luminance is highest in the predicted direction. FIG.

7C is an example of light source data suitable to the use of flash. The probability that flash is irradiated in the horizontal direction is high. Because of this, light source data in which luminance in the 0° latitude direction is highest is preferable. FIG. 7D is an example of light source data suitable to the case where the setting of image capturing mode is "night scene". In this case, it is inferred that the image capturing scene is a night scene. Because of this, light source data in which luminance in the horizontal direction is comparatively high due to the light of a town is preferable.

Such various types of light source data are held in the ROM 108 etc. in the state of being associated with the image capturing condition data. FIG. 8 is an example of a light source data table holding a plurality of pieces of light source data in the state of being associated with the image capturing condition data. The initial light source data determining unit 204 searches initial light source data suitable to the image capturing condition data at that time by referring to such a light source data table. Specifically, an index E is calculated using the following formula (1) for each row of the light source data table shown in FIG. 8 and initial light source data is specified so that the index E will be a minimum.

$$E = \sum w_i(v_i - a_i)^2 \qquad \text{[Formula (1)]}$$

Where, $v_i$ and $a_i$ are parameters of the image capturing condition data, wherein $v_i$ is the image capturing condition data acquired at step 503 and $a_i$ is the image capturing condition data in the table held by the ROM 108 etc. The subscript corresponds to the number of parameters of the image capturing condition data and, for example, $v_1/a_1$ is the longitude of GPS information, $v_2/a_2$ is the latitude of GPS information, $v_3/a_3$ is the date of image capturing, and so on. With regard to parameters not represented by a numerical value, such as WB setting, an arbitrary numerical value shown in brackets in FIG. 8 is allocated etc. (for example, to the WB sunlight: a numerical value "0") is allocated, so as to bring about a state where comparison can be made. A coefficient $w_i$ is a weight coefficient. In the case where it is intended to use GPS information as a main determination factor with which to determine initial light source data, it is preferable to set the weight coefficient for GPS information larger than those for other parameters.

In the manner described above, light source data corresponding to the image capturing condition data acquired at step 503 is determined as initial light source data.

At step 505, the light source data deriving unit 205 derives light source data optimum for a scene based on the acquired image data, subject shape data, image capturing condition data (steps 501 to 503), and the determined initial light source data (step 504). Details of light source data derivation processing will be described later.

At step 506, the light source data output unit 206 outputs the derived light source data.

(Light Source Data Derivation Processing)

Figure 9:
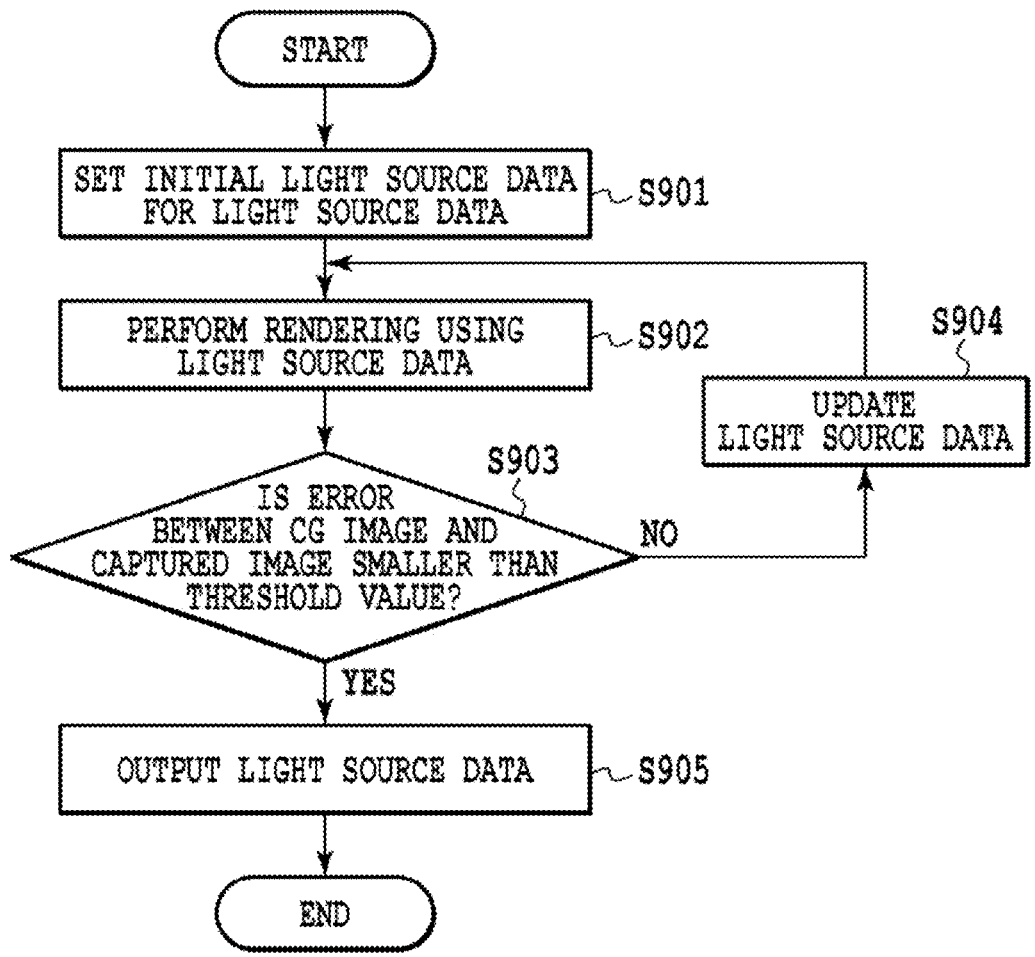
FIG. 9 is a flowchart showing a flow of light source data derivation processing in the first embodiment.

FIG. 9 is a flowchart showing a flow of light source data derivation processing at step 505. By this processing, optimized light source data by which it is possible to obtain a CG image close to the actually captured image.

At step 901, the light source data deriving unit 205 sets initial light source data sent from the initial light source data determining unit 204 as an initial value of light source data to be found. As will be described later, this flowchart has a loop structure and light source data in an i-th loop is represented by $L_i(\theta, \phi)$. At step 901, as an initial value, $L_0(\theta, \phi)$ is set.

Figures 10A, 10B:
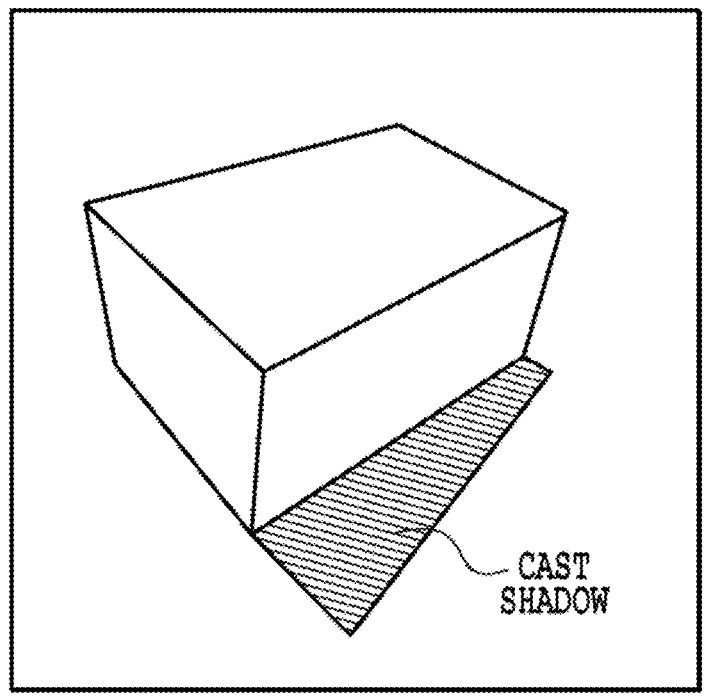
FIG. 10A is a diagram showing an example of a captured image and FIG. 10B is a diagram showing data of a light source in the image capturing environment.
Figures 11A, 11B:
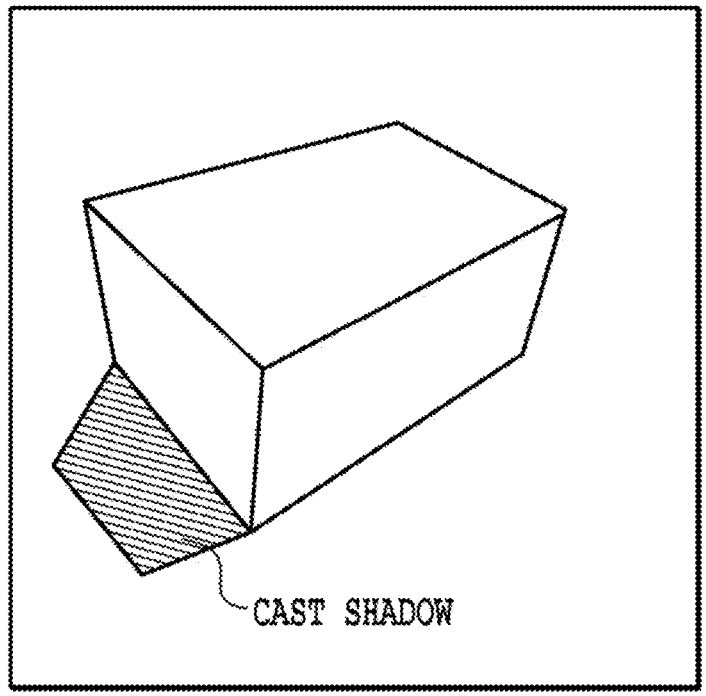
FIG. 11A is a diagram showing an example of a CG image having been subjected to rendering and FIG. 11B is a diagram showing data of a light source used at the time of rendering.

At step 902, the light source data deriving unit 205 performs rendering based on the initial light source data set at step 901 and the subject shape data and the image capturing condition data acquired at steps 502 and 503 described previously to generate CG image data. The image capturing condition data here is, specifically, parameters necessary for rendering, such as the field angle and the position of the camera. As the rendering method, a method aiming at accuracy physically, such as path tracing and photo mapping, is preferable so that a CG image and an actually photographed image can be compared. For details of this step, see [Okabe]. In addition, it is assumed that a CG image subjected to rendering using the light source data $L_i(\theta, \phi)$ is represented as $I_i$. Here, with reference to FIG. 10 and FIG. 11, the relationship between light source data and a CG image is explained. FIG. 10A is an example of a captured image (actually photographed image) and FIG. 10B shows data of the light source in the image capturing environment (that is, the light source data to be estimated). As is obvious from FIG. 10B, in this case, light is irradiated only from the 45° latitude and 0° longitude direction, and therefore it is possible to see a cast shadow in the position obliquely right under the cuboid, which is the subject in the captured image shown in FIG. 10A. On the other hand, FIG. 11A is an example of a CG image having been subjected to rendering and FIG. 11B shows data of the light source used at the time of the rendering. As is obvious from FIG. 11B, light is irradiated from an erroneous direction (the latitude is correct, however, the longitude is not 0° but 90°), and therefore it is possible to see a cast shadow in the position obliquely left under the cuboid, which is a subject, in the rendering result (CG image) shown in FIG. 11A. From the examples shown in FIG. 10 and FIG. 11, it is known that the light source data shown in FIG. 11B is inappropriate as light source data in the scene because the difference between the actually captured image and the CG image having been subjected to rendering is large. For the convenience of explanation, the example is used in which the light source data used for rendering is extremely inappropriate; however, in the light source data derivation processing according to the present embodiment, as explained already, light source data comparatively close to the ideal is set as initial light source data.

At step 903, the light source data deriving unit 205 finds an error $\Delta_i$ between the CG image generated at step 902 and the captured image, and determines whether the error $\Delta_i$ that is found is smaller than a predetermined threshold value. As a method for finding an error, it may also be possible to find the RMS error, which requires a light load of calculation or to use the VDP (Visual Difference Predictor) for calculating a difference between images by making use of the human visual characteristics or the S-CIELAB. In the case where the error $\Delta_i$ that is found is smaller than a predetermined threshold value (for example, in the case where the S-CIELAB is used to find an error, 1, which is the human detection limit, is set as the threshold value), the procedure proceeds to step 905. On the other hand, in the case where the error $\Delta_i$ that is found is larger than the predetermined value, the procedure proceeds to step 904.

At step 904, the light source data deriving unit 205 updates the contents of the light source data based on the error $\Delta_i$ found at step 903. Specifically, next light source data $L_{i+1}(\theta, \phi)$ is calculated using the following formula (2).

$$L_{i+1}(\theta, \varphi) = L_i(\theta, \varphi) - \frac{(\Delta_i - \Delta_{i-1})}{L_i(\theta, \varphi) - L_{i-1}(\theta, \varphi)}\delta \qquad \text{[Formula (2)]}$$

Where, $\delta$ is a parameter to specify an extent to which the light source data is updated and for example, is set to 1. In the case where much time is required for calculation, $\delta$ is set to a larger value or on the contrary, in the case where the set value is too large and precision is low, δ is set to a smaller value, thus δ is set appropriately. At the point of time of the first loop (that is, in the case where i=0), neither $\Delta_{i-1}$ nor (θ, φ) is obtained yet. Consequently, in the first loop, in place of the formula (2), the following formula (3) is used to update light source data.

$$L_{i+1}(\theta,\phi)=L_i(\theta,\phi)-\delta$$

After the light source data is updated in this manner and the next updated data $L_{i+1}$ (θ, φ) is obtained, the procedure returns to step 902 and rendering is performed based on the updated light source data. Then, whether the error $\Delta_i$ between a newly obtained CG image and the captured image is smaller than the threshold value is determined (step 903) and the same processing is repeated until it is determined that the error $\Delta_i$ is smaller than the threshold value.

At step 905, the light source data deriving unit 205 outputs the derived light source data (the light source data for which it is determined that the error $\Delta_i$ is smaller than the predetermined threshold value) to the light source data output unit 206.

In this manner, light source data optimum for a scene is derived.

As described above, according to the invention of the present embodiment, in the processing to derive appropriate light source data, the initial value of light source data (initial light source data) is set based on the image capturing condition data which represents the characteristics of the light source, such as the white balance setting. Due to this, it is possible to cause optimized calculation of light source data to converge earlier and further, to reduce a risk that an erroneous result is obtained because the optimization results in a local solution.

In the present embodiment, a camera is used as an example of an information processing device for performing light source estimation; however, this is not limited. For example, it may also be possible for a CPU of a computer having received digital image data to perform light source estimation processing by causing various kinds of software to run.

Second Embodiment

In the first embodiment, the subject shape data obtained by performing measurement using the 3D scanner etc. and stored in the ROM 108 etc. in advance is acquired and used for light source data derivation processing. Next, an aspect is explained as a second embodiment, in which estimation of subject shape is performed based on acquired image data and image capturing condition data, and light source data is derived using the obtained shape data. Explanation of parts common to those of the first embodiment is simplified or omitted and here, different points are explained mainly.

Figure 12:
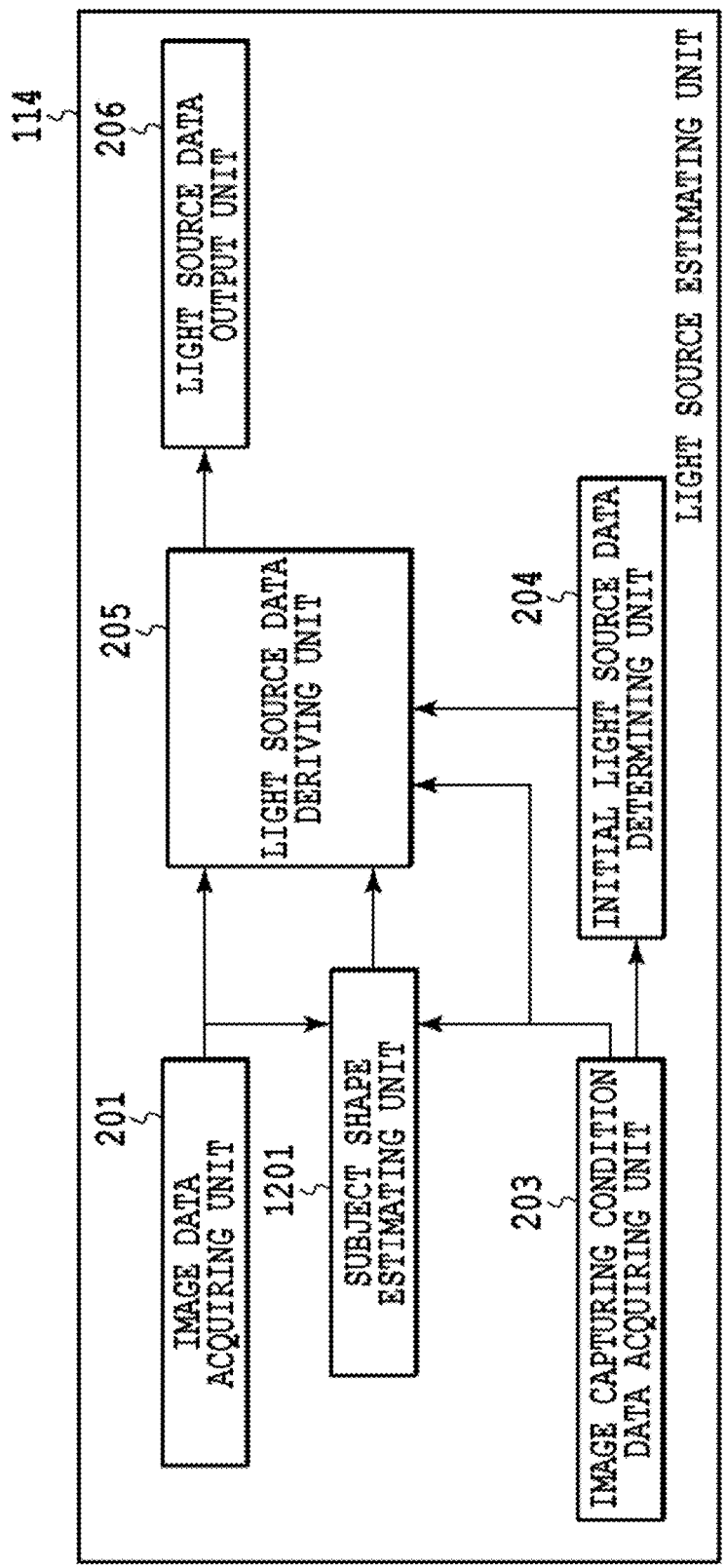
FIG. 12 is a function block diagram showing an internal configuration of a light source estimating unit according to a second embodiment.

FIG. 12 is a function block diagram showing an internal configuration of the light source estimating unit 114 according to the present embodiment. The light source estimating unit 114 differs greatly from the light source estimating unit 114 according to the first embodiment (see FIG. 2) in that a subject shape estimating unit 1201 is provided in place of the subject shape data acquiring unit 202.

Figure 13:
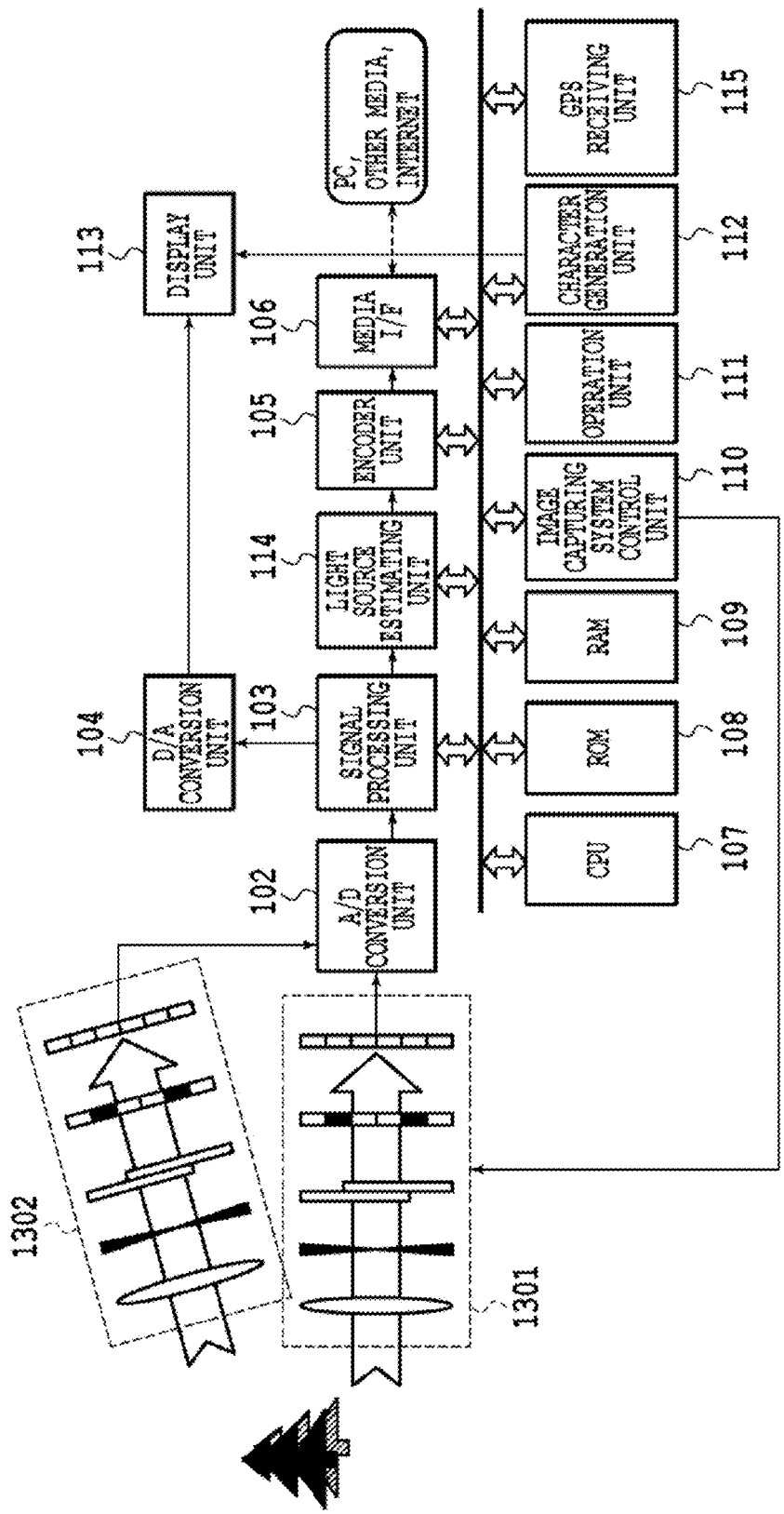
FIG. 13 is a diagram showing an example of a configuration of a camera including a plurality of image capturing units as an information processing device for performing light source estimation according to the second embodiment.
Figure 14A:
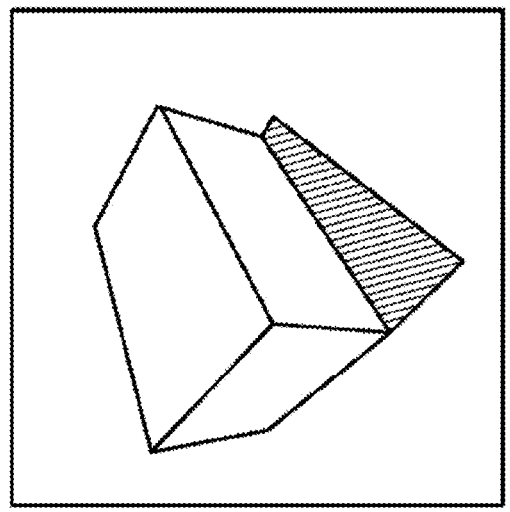
FIGS. 14A to 14C are diagrams each showing an example of a multi-viewpoint image in the case where the image is captured from three different viewpoints.
Figure 14B:
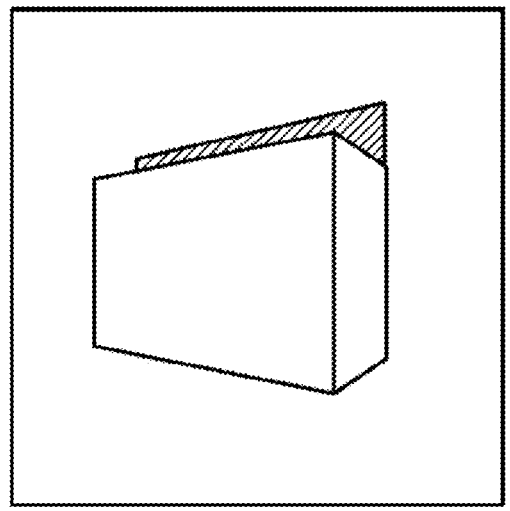
Figure 14C:
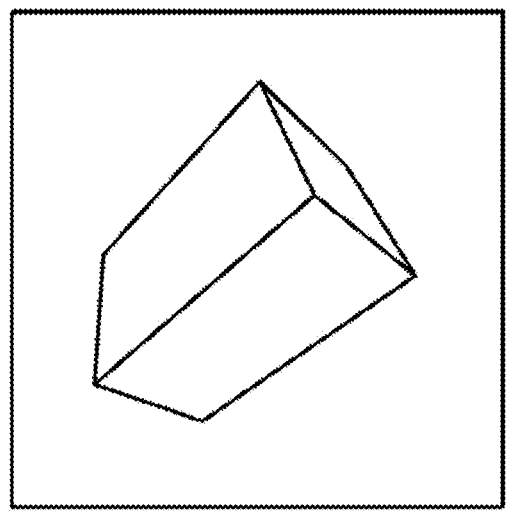

In the case of the present embodiment, it is preferable that image data acquired by the image data acquiring unit 201 is data which consists of images captured from a plurality of different viewpoints (multi-viewpoint image data). FIG. 13 is a diagram showing an example of a configuration of a camera, as an information processing device for performing light source estimation, including a plurality of image capturing units according to the present embodiment. FIG. 13 shows two image capturing units, that is, image capturing units 1301 and 1302; however, it is possible to arbitrarily set the number of image capturing units and arrangement thereof. For example, it is possible to consider a case where nine image capturing units are arranged uniformly on a square lattice and in the case of such a camera adopting a camera array system, it is possible to obtain data of images from nine viewpoints by one-time image capturing. Further, it may also be possible to obtain multi-viewpoint image data by performing image capturing a plurality of times while shifting the viewpoint using a camera having a single lens system image capturing unit configured to capture one image by one-time image capturing (see FIG. 1). FIGS. 14A to 14C are diagrams each showing an example of a multi-viewpoint image in the case where the images are captured from three different viewpoints using, for example, a camera having a single lens system image capturing unit.

Figure 15:
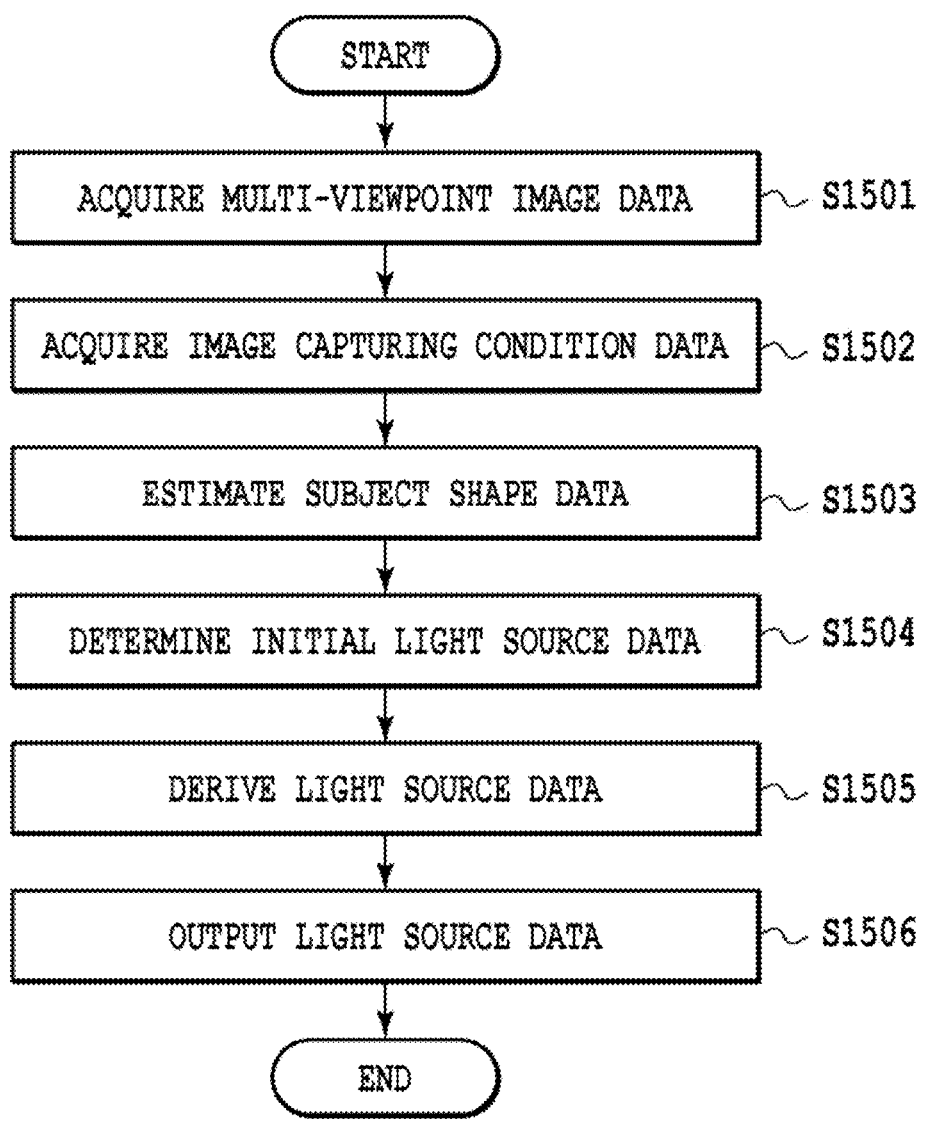
FIG. 15 is a flowchart showing a flow of light source estimation processing in the second embodiment.

FIG. 15 is a flowchart showing a flow of light source estimation processing in the present embodiment.

At step 1501, the image data acquiring unit 201 acquires multi-viewpoint image data having been subjected to predetermined image processing from the signal processing unit 103. The acquired multi-viewpoint image data is sent to the subject shape estimating unit 1201 and the light source data deriving unit 205.

At step 1502, the image capturing condition data acquiring unit 203 acquires image capturing condition data from the operation unit 111 etc. The acquired image capturing condition data is sent to the subject shape estimating unit 1201, the initial light source data determining unit 204, and the light source data deriving unit 205.

At step 1503, the subject shape estimating unit 1201 estimates the shape of a subject from multi-viewpoint image data. The method for estimating the shape of a subject from a plurality of images with different viewpoints is widely known, and for example, it is possible to perform calculation using the SfM (Structure from Motion). Although explanation of specific estimation processing is omitted here, it is preferable to include position information etc. of the camera in the image capturing condition data and to make use thereof in the case where, for example, the SfM is adopted. The calculated subject shape data is sent to the light source data deriving unit 205 together with an evaluation value which represents accuracy or reliability of the data. Here, the evaluation value is explained. In shape estimation, points (regions) corresponding to each other between a plurality of images are extracted. Then, an evaluation value is given to subject shape data in such a manner that the higher the degree of coincidence between corresponding points, the higher the evaluation value is. At this time, it is preferable to take a threshold value (for example, 90%) set in relation to the degree of coincidence to be an evaluation value of shape estimation.

At step 1504, the initial light source data determining unit 204 determines initial light source data corresponding to the image capturing condition data by referring to a light source data table saved in the ROM 108 etc. The processing here is the same as that at step 504 of the flowchart in FIG. 5 according to the first embodiment.

At step 1505, the light source data deriving unit 205 derives light source data in the scene based on the acquired multi-viewpoint image data and image capturing condition data, the calculated subject shape data, and the determined initial light source data. The light source data derivation processing according to the present embodiment is substantially the same as that at step 505 of the flowchart in FIG. 5 according to the first embodiment (see the flowchart in FIG. 9), however, differs in the following points.

First, the multi-viewpoint image data is acquired at step 1501, therefore the rendering processing at step 902 and the error determination processing of a CG image and a captured image at step 903 are also performed for each of the images with different viewpoints (that is, nine times in the case where images corresponding to nine viewpoints are included).

Further, the threshold value at the time of evaluation of the error between the CG image and the captured image at step 903 is set as follows. In the case of the subject shape data estimated from a plurality of images, as a matter of course, the deviation from the actual subject is usually large compared to the subject shape data etc. obtained by using a measurement device, such as a 3D scanner. Consequently, it is supposed that the error between the CG image having been subjected to rendering using subject shape data with a large deviation, and the actually captured image is also large. Because of this, the threshold value used at this step is set to a value larger than that in the case of the first embodiment. Specifically, the threshold value at step 903 is set in accordance with the evaluation value of shape estimation received together with the subject shape data. For example, at the time where correspond points are extracted in the subject shape estimating unit 1201, it is assumed that an algorithm adopts as a corresponding point in the case where a difference between images near the corresponding point is equal to or less than a threshold value C. In this case, the threshold value at step 903 is also set to C, and so on. It is desirable to appropriately set the threshold value at step 903 depending on the magnitude of the error that is supposed, for example, to set the threshold value to 2C in the case where an error occurs by another factor.

At step 1506, the light source data output unit 206 outputs the derived light source data. As described above, in the case of the present embodiment, the light source data, for which it is determined that the error is smaller than the threshold value, is derived in the number of pieces of data corresponding to the number of images with different viewpoints, and therefore, there is a possibility that light source data whose contents are different for each image is derived depending on the set threshold value. In such a case, it is sufficient to determine one piece of light source data by repeating the processing at step 1505 until the same result is obtained for all the images by setting the threshold value again, or taking the light source data, for which it is determined that the error is smaller than the threshold value in the largest number of images, to be the final light source data, or the like.

As described above, according to the invention of the present embodiment, the shape of a subject is estimated from multi-viewpoint image data, therefore it is possible to obviate the need to prepare subject shape data by measuring the shape of the subject using a 3D scanner etc. in advance.

Third Embodiment

Next, an aspect is explained as a third embodiment, in which initial light source data used for light source data derivation processing is determined by using an external server etc. connected to a communication network. Explanation of parts common to those of the other embodiments is simplified or omitted and here, different points are explained mainly.

Figure 16:
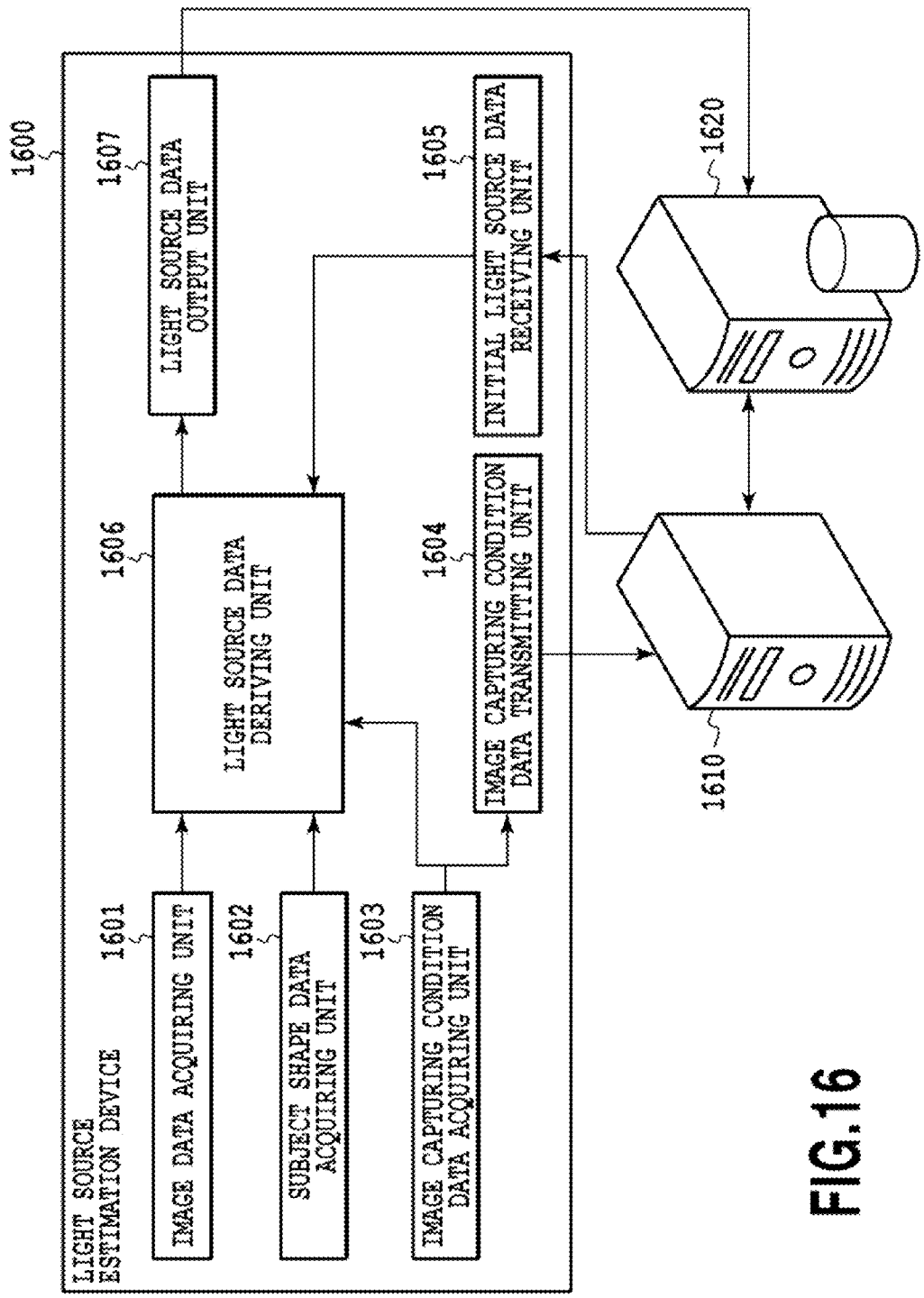
FIG. 16 is a diagram showing a system configuration example of an information processing system for performing light source estimation according to a third embodiment.

FIG. 16 is a diagram showing a system configuration example of an information processing system for performing light source estimation according to the present embodiment. A light source estimation device 1600 is a PC etc. and substantially corresponds to the light source estimating unit 114 in the first embodiment. The light source estimation device 1600 according to the present embodiment differs largely from the light source estimating unit 114 according to the first embodiment (see FIG. 2) in that the light source estimation device 1600 does not include the initial light source data determining unit but includes an image capturing condition data transmitting unit 1604 and an initial light source data receiving unit 1605 instead. Then, the light source estimation device 1600 is connected to a processing server 1610 as an initial light source data determining unit and a data server 1620 as a light source data storage unit (light source database) to each other via a communication network, such as the Internet.

Figure 17:
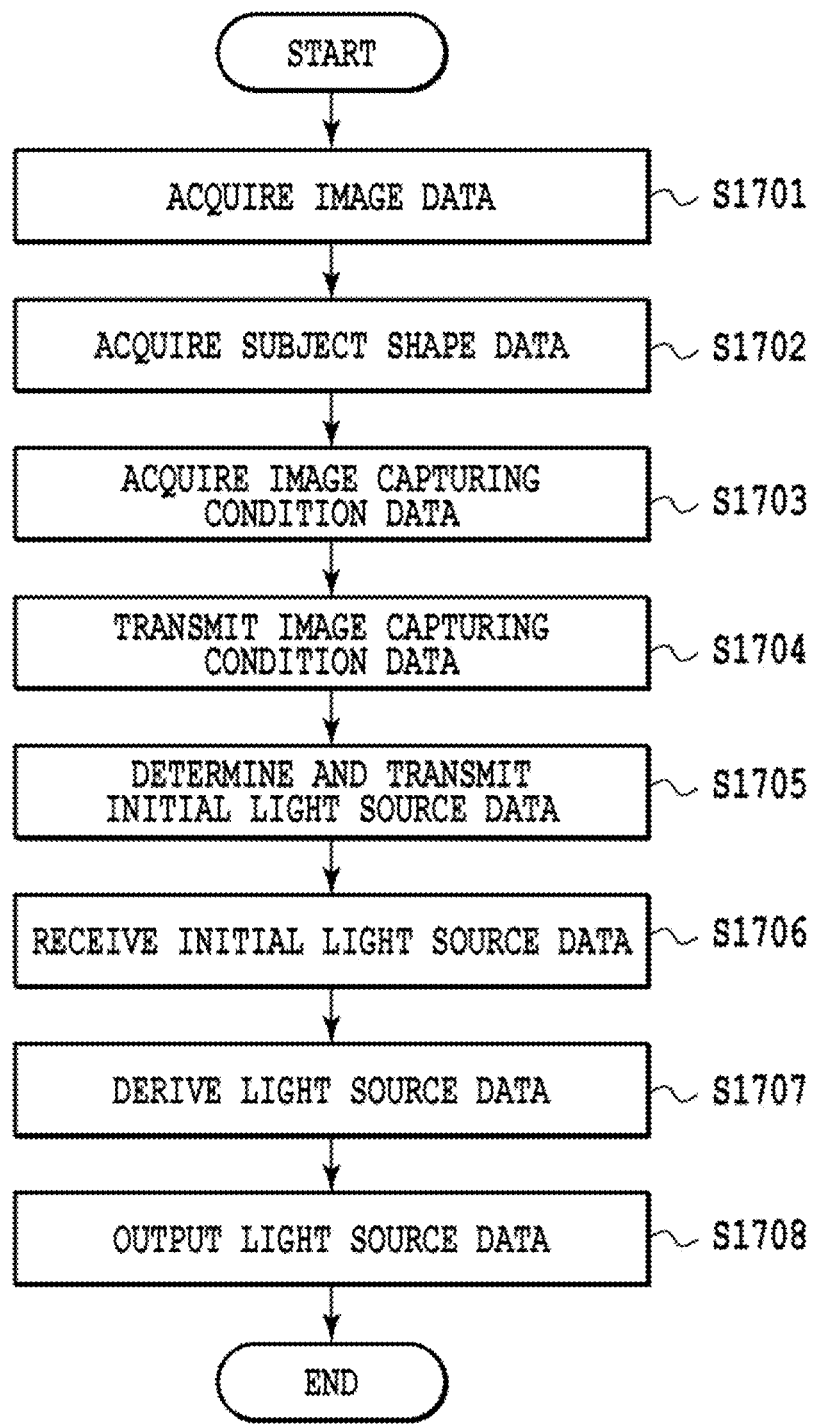
FIG. 17 is a flowchart showing a flow of light source estimation processing in the third embodiment.

FIG. 17 is a flowchart showing a flow of light source estimation processing in the present embodiment.

At step 1701, an image data acquiring unit 1601 of the light source estimation device 1600 acquires image data having been subjected to predetermined image processing from a camera etc., not shown schematically. The acquired image data is sent to a light source data deriving unit 1606.

At step 1702, a subject shape data acquiring unit 1602 of the light source estimation device 1600 acquires subject shape data from an HDD (not shown schematically) etc. in which subject shape data is stored.

At step 1703, an image capturing condition data acquiring unit 1603 of the light source estimation device 1600 acquires image capturing condition data from a camera etc., not shown schematically. The acquired image capturing condition data is sent to the light source data deriving unit 1606 and the image capturing condition data transmitting unit 1604.

At step 1704, the image capturing condition data transmitting unit 1604 transmits the acquired image capturing condition data to the processing server 1610 as an initial light source data determining unit.

At step 1705, the processing server 1610 determines one piece of initial light source data corresponding to the image capturing condition data from various pieces of light source data stored in the data server 1620 and transmits the data to the light source estimation device 1600.

Figure 18:
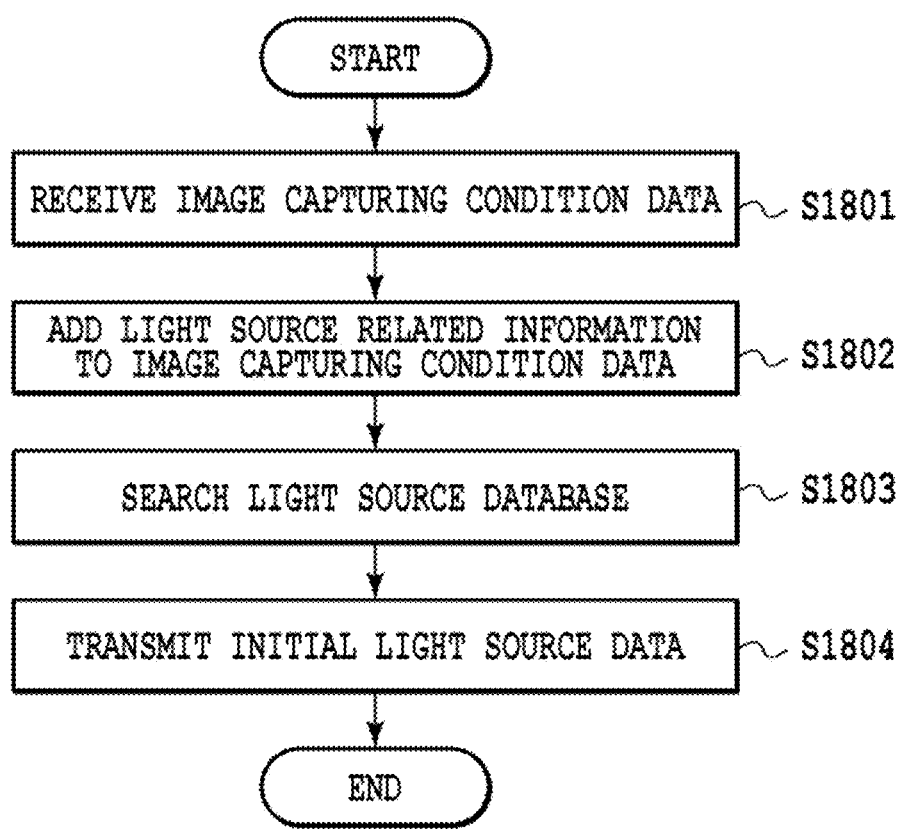
FIG. 18 is a flowchart showing a flow of initial light source data determination processing in a processing server according to the third embodiment.

FIG. 18 is a flowchart showing a flow of initial light source data determination processing in the processing server 1610 according to the present embodiment.

At step 1801, the processing server 1610 receives image capturing condition data from the light source estimation device 1600.

At step 1802, the processing server 1610 adds light source related information to the received image capturing condition data. The light source related information refers to, for example, weather information at the point of image capturing obtained from GPS information, date, etc., included in the image capturing condition data. The weather information may be information indicative of clear or cloudy weather, or information of an image of the image capturing point captured from the sky by a weather satellite at the time of image capturing (or before or after the time). The use of a captured image has an advantage that more detailed weather information can be obtained. Such weather information is acquired by making use of the weather services etc. provided by a processing device connected to the communication network. As an alternative example of light source related information, there can be thought, for example, information, such as the name of a building located at the image capturing point, which is obtained by acquiring the address of the image capturing point using services, such as inverse Geocoding, from GPS information.

At step 1803, the processing server 1610 accesses the data server 1620, searches for light source data corresponding to the image capturing condition data, and determines initial light source data based on the image capturing condition data to which light source related information is added. The method for determining initial light source data is the same as that at step 504 of the first embodiment.

At step 1804, the processing server 1610 transmits the determined initial light source data to the light source estimation device 1600.

Explanation is returned to the flowchart in FIG. 17.

At step 1706, the initial light source data receiving unit 1605 of the light source estimation device 1600 receives the initial light source data.

At step 1707, the light source data deriving unit 1606 derives light source data. The method for deriving light source data is the same as that explained in the flowchart in FIG. 9 of the first embodiment.

At step 1708, a light source data output unit 1607 outputs the derived light source data. Outputting here includes saving the light source data in a storage medium, for example, a memory card etc., not shown schematically. Further, the derived light source data after calculation for optimization and the image capturing condition data thereof are sent to the data server 1620. At this time, it is preferable to transmit also an evaluation value (value indicative of the degree of matching with the actual light source) of the derived light source data. The evaluation value may be, for example, the threshold value used at step 903 of the flowchart in FIG. 9 or a value (0 to 100%: the larger the value, the higher the evaluation is) a user sets separately. In the data server 1620 having received the light source data and image capturing condition data thereof, processing to add the received light source data and image capturing condition data thereof to a light source data table (processing to update a light source data table) is performed. FIG. 19 shows an example of the updated light source data table, to which weather information 1901 and an evaluation value 1902 are added, which are items not included in the light source data table (see FIG. 8) according to the first embodiment. Preferably, maker side creates a light source data table including several kinds of basic light source data at first as the light source database according to the present embodiment, and then, the light source data table is updated each time a user creates light source data afterward (or in response to instructions for update from a user at that time).

As described above, according to the invention of the present invention, an independent light source database shared on a communication network is used, and therefore, it is possible to hold more pieces of light source data and to quickly and stably derive light source data most suitable to a scene. Further, newly created light source data is added to the light source database each time it is created, and therefore, derivation of light source data with higher precision is enabled.

Fourth Embodiment

Next, an aspect is explained as a fourth embodiment, in which light source data is derived easily without using shape data of an actual subject. Explanation of parts common to those of the other embodiments is simplified or omitted and here, different points are explained mainly.

Figure 20:
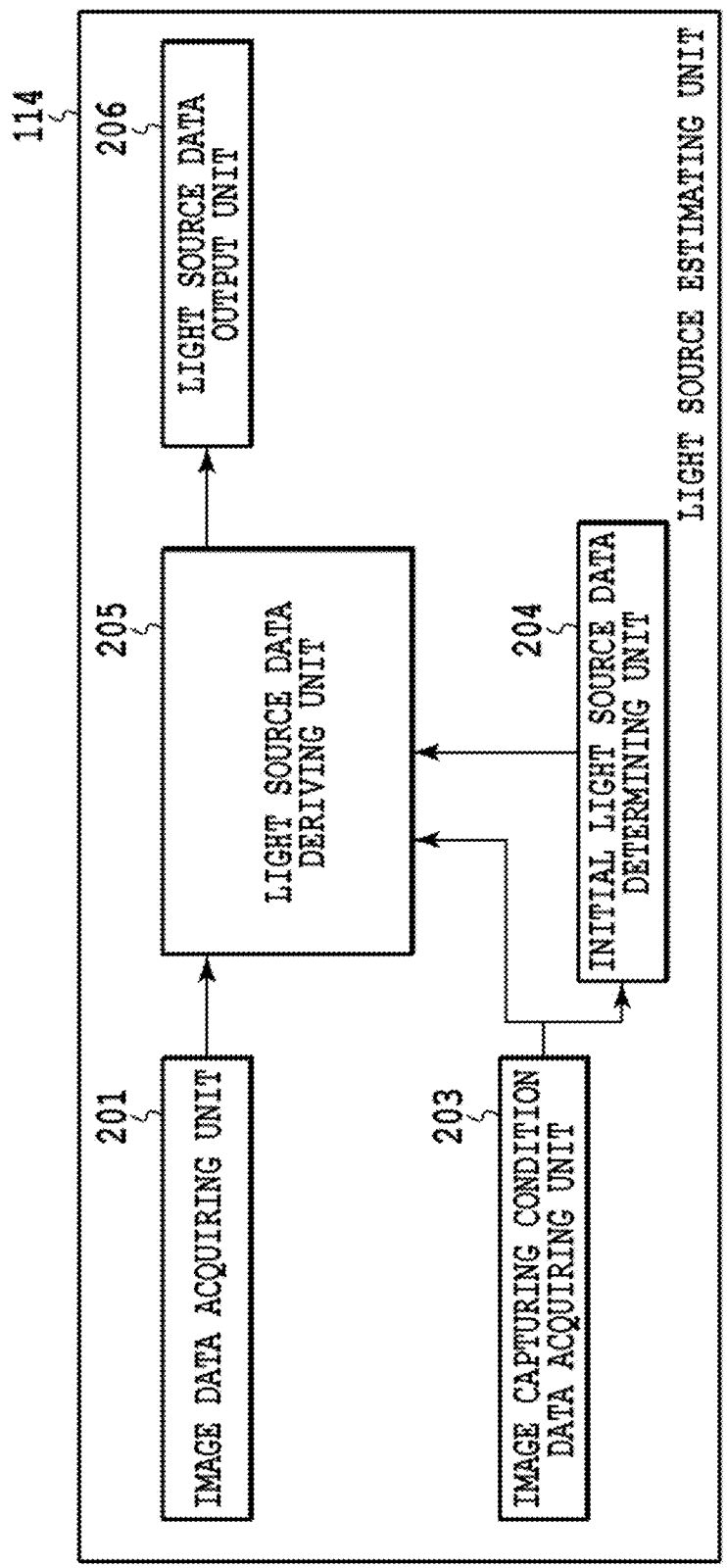
FIG. 20 is a function block diagram showing an internal configuration of a light source estimating unit according to a fourth embodiment.

FIG. 20 is a function block diagram showing an internal configuration of the light source estimating unit 114 according to the present embodiment.

The light source estimating unit 114 according to the present embodiment includes the image data acquiring unit 201, the image capturing condition data acquiring unit 203, the light source data deriving unit 205, the initial light source data determining unit 204, and the light source data output unit 206, and a subject shape data acquiring unit 202 configured to acquire shape data of an actual subject is not included.

Figure 21:
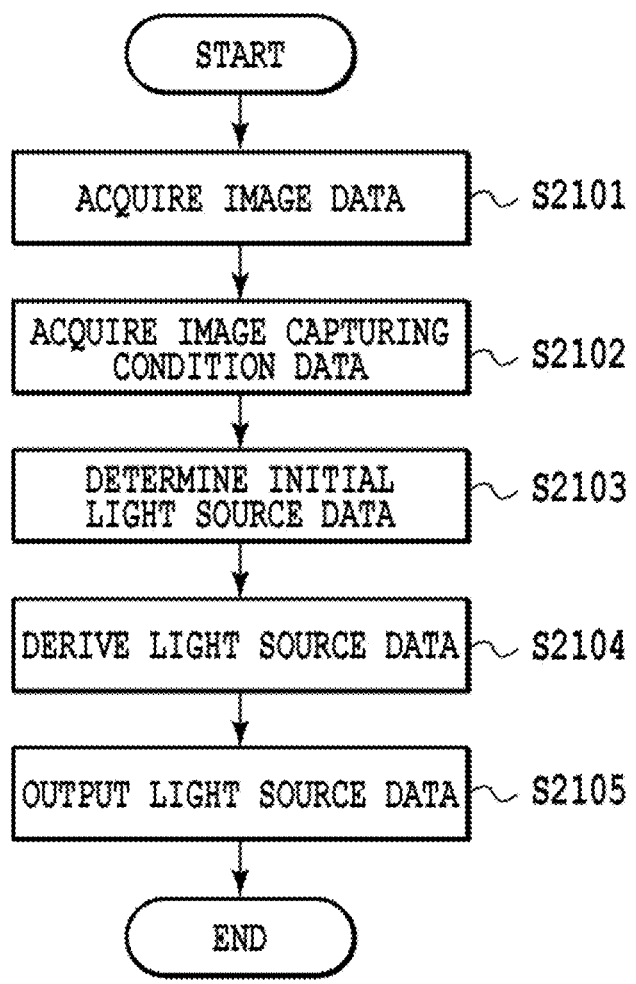
FIG. 21 is a flowchart showing a flow of light source estimation processing in the fourth embodiment.

FIG. 21 is a flowchart showing a flow of light source estimation processing in the present embodiment.

At step 2101, the image data acquiring unit 201 acquires image data having been subjected to predetermined image processing from the signal processing unit 103. The acquired image data is sent to the light source data deriving unit 205.

At step 2102, the image capturing condition data acquiring unit 203 acquires image capturing condition data from the operation unit 111 etc. The acquired image capturing condition data is sent to the light source data deriving unit 205 and the initial light source data determining unit 204.

At step 2103, the initial light source data determining unit 204 determines initial light source data corresponding to the image capturing condition data by referring to a light source data table saved in the ROM 108 etc.

At step 2104, the light source data deriving unit 205 derives light source data of a scene based on the acquired image data, the image capturing condition data (steps 2101, 2102) and the determined initial light source data (step 2103). In the light source data derivation processing in the present embodiment, shape data of a subject is not input, therefore rendering is performed using simplified shape data in place thereof. Here, as simplified shape, for example, a plane having the material attribute of a reflectance of 50% that stands facing a camera is preferable. It is desirable to set the distance between the plane and the camera in this case to a subject distance included in the image capturing condition data. Further, it is desirable to set the size of the plane to the size of a human, such as 2 m×0.5 m in the case of the portrait mode, or to a size that covers the whole of the image from the field angle of the camera included in the image capturing condition data in the case of other than the portrait mode. Data of simplified shape in place of shape data of an actual subject is provided in an HDD etc. in advance. By rendering based on such data of simplified shape, a CG image is generated and optimum light source data is derived using the CG image data.

At step 2105, the light source data output unit 206 outputs the derived light source data.

It is also possible to apply the method that uses simplified shape data described above to the third embodiment and to derive light source data via a communication network. At that time, it is desirable to attach an index indicating that the light source data is derived in the state where there is no subject shape data to the light source data in the light source database.

As described above, according to the invention of the present embodiment, simplified shape data is used instead of acquiring subject shape data, and therefore, it is possible to derive optimum light source data more quickly.

Fifth Embodiment

In the fourth embodiment, light source data is derived using simplified shape data in place of subject shape data. Next, an aspect is explained as a fifth embodiment, in which light source data is derived more easily without using even simplified shape data. Explanation of parts common to those of the other embodiments is simplified or omitted and here, different points are explained mainly.

Figure 22:
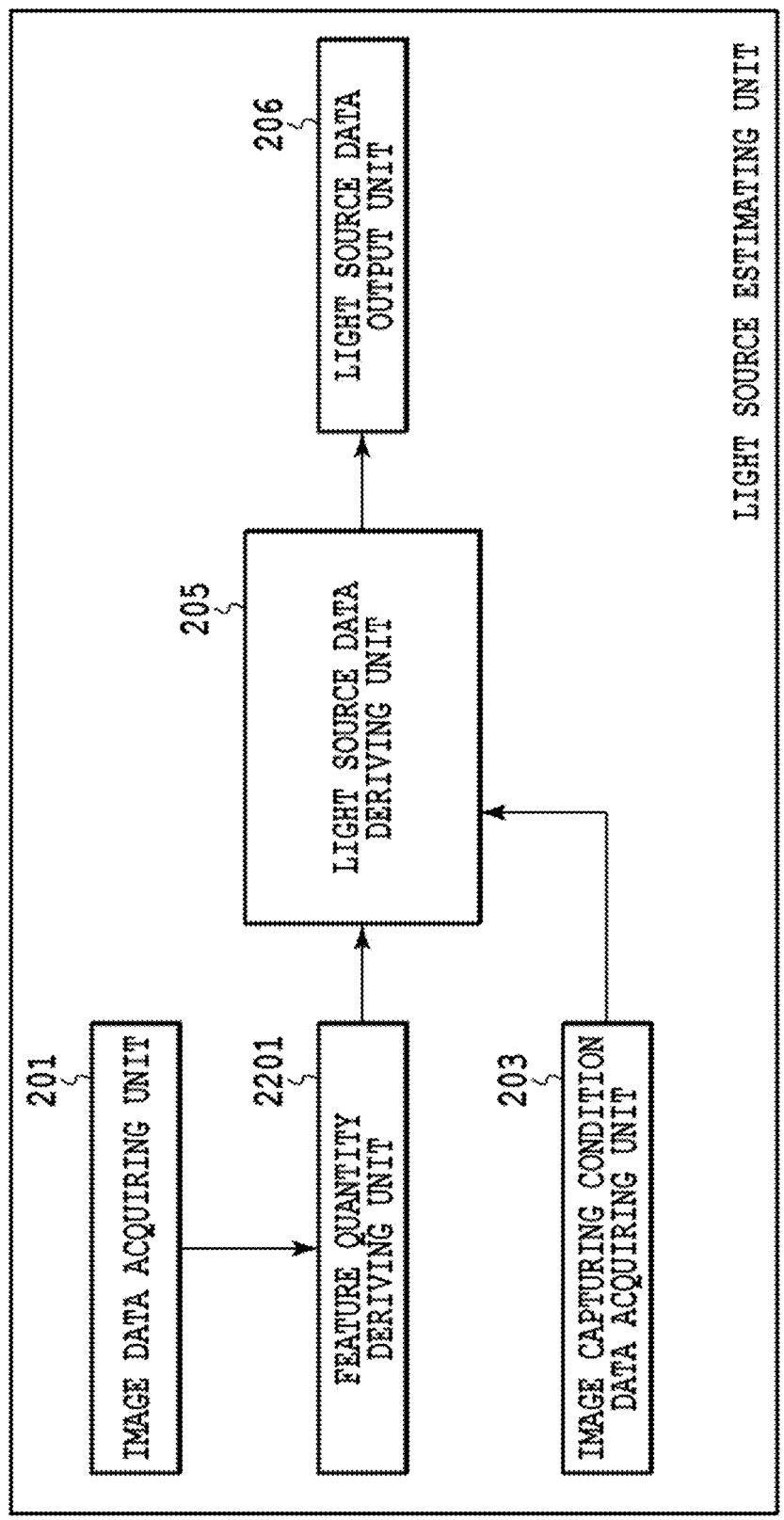
FIG. 22 is a function block diagram showing an internal configuration of a light source estimating unit according to a fifth embodiment.

FIG. 22 is a function block diagram showing details of the light source estimating unit 114 according to the present embodiment. The light source estimating unit 114 according to the present embodiment includes the image data acquiring unit 201, the image capturing condition data acquiring unit 203, a feature quantity deriving unit 2201, the light source data deriving unit 205, and the light source data output unit

206. The configuration unique to the present embodiment is the feature quantity deriving unit 2201.

The feature quantity deriving unit 2201 analyzes image data received from the image data acquiring unit 201 and derives feature quantities, which are features of the image represented by numerical values (hereinafter, referred to as "image feature quantities"), such as an average color temperature of the image, a histogram of the pixel values, an average Lab value of light source data, and a variance value of the histogram of the pixel values. In the present embodiment, a case where the average color temperature of the image and the histogram of the pixel values are adopted as the image feature quantities is explained.

Figure 23:
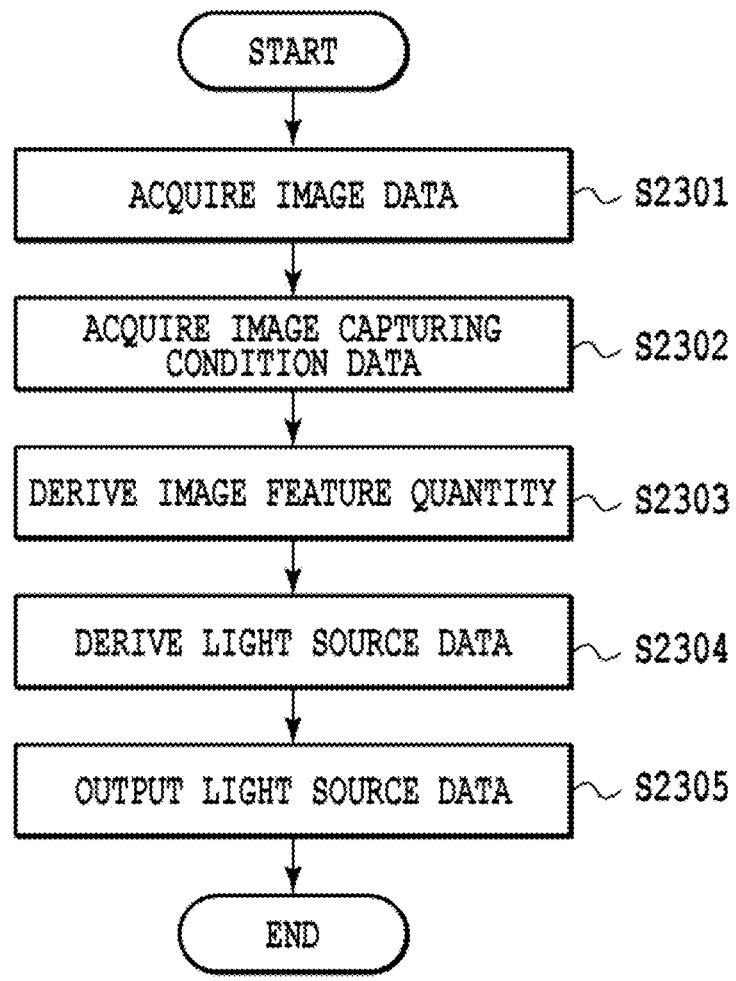
FIG. 23 is a flowchart showing a flow of light source estimation processing in the fifth embodiment.

FIG. 23 is a flowchart showing a flow of light source estimation processing in the present embodiment.

At step 2301, the image data acquiring unit 201 acquires image data having been subjected to predetermined image processing from the signal processing unit 103. The acquired image data is sent to the feature quantity deriving unit 2201.

At step 2302, the image capturing condition data acquiring unit 203 acquires image capturing condition data from the operation unit 111 etc. The acquired image capturing condition data is sent to the light source data deriving unit 205.

At step 2303, the feature quantity deriving unit 2201 analyzes the image data received from the image data acquiring unit 201 and derives image feature quantities (here, the average color temperature of the image and the histogram of the pixel values). Specifically, derivation is performed as follows.

In the case of the average color temperature of the image, first, RGB values are converted into chromaticities XYZ based on the used color space profile of the image and the chromaticities are converted into correlated color temperatures, thereby the color temperatures of the image are obtained. Then, the obtained color temperatures are averaged to derive the average color temperature.

In the case of the histogram of the pixel values, the number of times of appearance of the luminance value of each pixel in the image is counted and the frequency of appearance is found, thereby the histogram is derived.

At step 2304, the light source data deriving unit 205 refers to a light source data table saved in the ROM 108 etc. and acquires light source data corresponding to the image capturing condition data and the image feature quantities. FIG. 24 is a diagram showing an example of the light source data table according to the present embodiment. In the case of the light source data table in the present embodiment, a plurality of pieces of light source data is held in the state of being associated with the image capturing condition data and the feature quantities of the light source data corresponding to the image feature quantities. Here, as the feature quantities of the light source data, information of the average color temperature and the histogram of the pixel values are associated and held. The average color temperature of the light source data is obtained as follows. First, the luminance value held for each angle is extended to the RGB value. Then, the RGB value corresponding to each direction is converted into the color temperature. The converted color temperature is averaged. The histogram is obtained as follows. The number of times of appearance of each luminance (0 to 1) in the light source data is counted at 0.1 intervals by setting bins and the counted number is divided by the number of samples. For example, in the case of the light source data shown in FIG. 7D, the counted number of each luminance is (0, 0, 8, 0, 4, 0, 0, 0, 0) and the counted number is divided by 12, the number of samples, thereby (0, 0, 0.66, 0, 0.33, 0, 0, 0, 0) is obtained as the histogram. It is needless to say the in the case where an index other than the average color temperature and the histogram of the pixel values is used as an image feature quantity, a value corresponding to the image feature quantity is found and held in the light source data table.

A method for creating a histogram of image data that can be compared with the histogram of light source data, such as that represented by (0, 0, 0.66, 0, 0.33, 0, 0, 0, 0) described above is shown below. It is assumed that the pixel values of image data are set in the range between 0 and 255. First, each pixel in the image data is converted so that the range of the pixel values is between 0 and 1. Such conversion can be implemented by dividing each pixel value of each pixel by 255. Next, bins are set at 0.1 intervals in the range between 0 and 1 and the number of times of appearance of each pixel value of each pixel after the conversion is counted. As a data example of the count result, mention is made of (5000, 10000, 650000, 320000, 10000, 5000, 0, 0) etc. in the case where the image size is 1,000 pixels×1,000 pixels. The data of the count result is divided by the number of samples, that is, 1,000×1,000=1,000,000, thereby (0.005, 0.01, 0.65, 0.32, 0.01, 0.005, 0, 0) is obtained. This data is the histogram of the image data that can be compared with the histogram of the light source data.

At this step, by referring to the light source data table as described above, one piece of light source data corresponding to the image capturing condition data acquired at step 2302 and the image feature quantities derived as step 2303 is selected. It is possible to perform this selection by the same method as that at step (step 504) at which the initial light source data is determined of the flowchart in FIG. 5 according to the first embodiment. That is, the index E is calculated using the formula (1) described previously for each row of the light source data table as shown in FIG. 24 and light source data is selected so that the index E becomes a minimum.

At step 2305, the light source data deriving unit 205 outputs the derived light source data to the light source data output unit 206. As the output method in this case, it may also be possible to record the light source data at the header of the image data to be saved or to generate and save a light source data file separately from the image file.

As described above, according to the invention of the present embodiment, it is possible to easily derive light source data close to the light source in the environment in which image capturing is performed.

Sixth Embodiment

Next, an aspect is explained as a sixth embodiment, in which light source data is derived by processing data of a captured image. Explanation of parts common to those of the other embodiments is simplified or omitted and here, different points are explained mainly.

Figure 25:
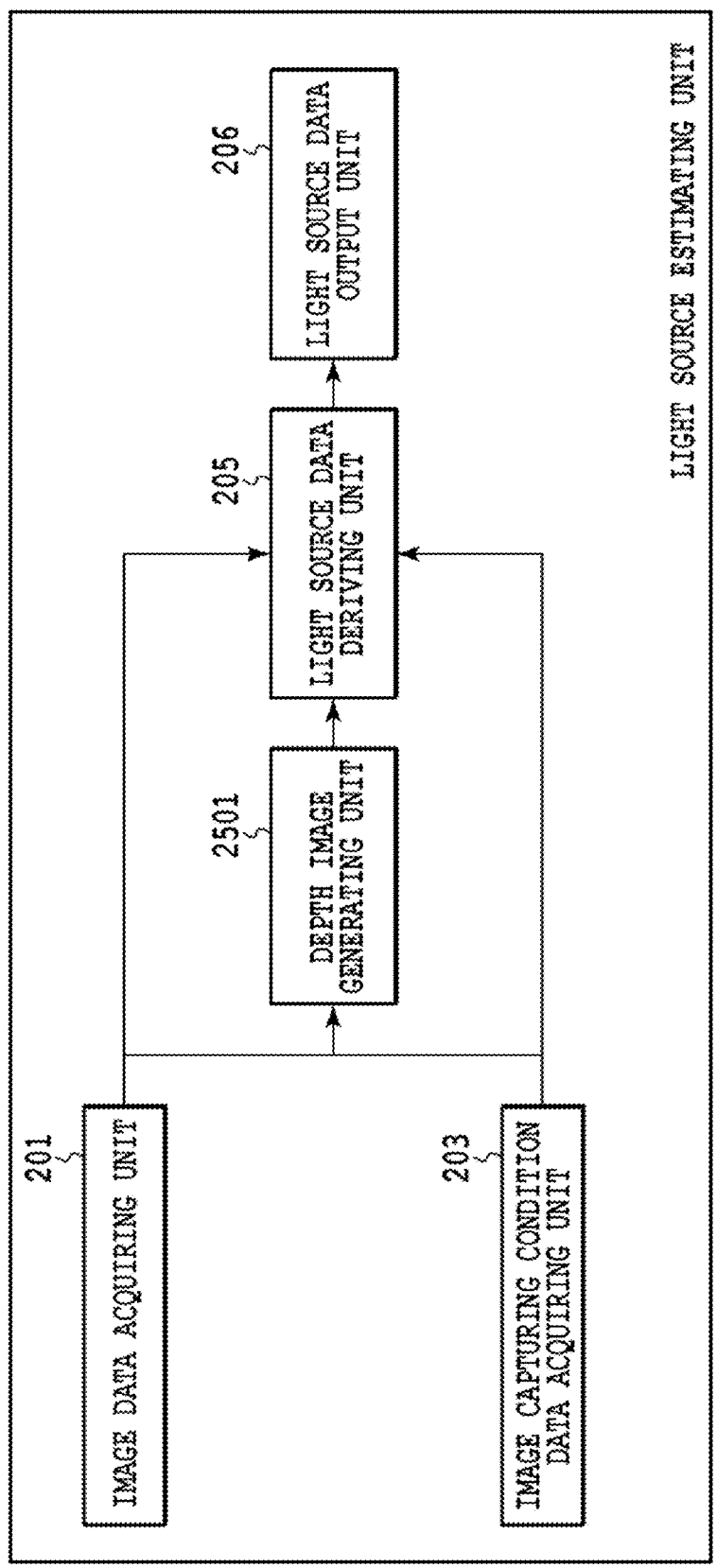
FIG. 25 is a function block diagram showing an internal configuration of a light source estimating unit according to a sixth embodiment.

FIG. 25 is a function block diagram showing details of the light source estimating unit 114 according to the present embodiment. The light source estimating unit 114 according to the present embodiment includes the image data acquiring unit 201, the image capturing condition data acquiring unit 203, a depth image generating unit 2501, the light source data deriving unit 205, and the light source data output unit 206. The configuration unique to the present embodiment is the depth image generating unit 2501.

The depth image generating unit 2501 generates a depth image representing information of a distance from a camera to a subject by an image. Details of depth image generation will be described later.

It is preferable for image data acquired by the image data acquiring unit 201 according to the present embodiment to be multi-viewpoint image data of images captured from a plurality of different viewpoints as in the second embodiment.

Figure 26:
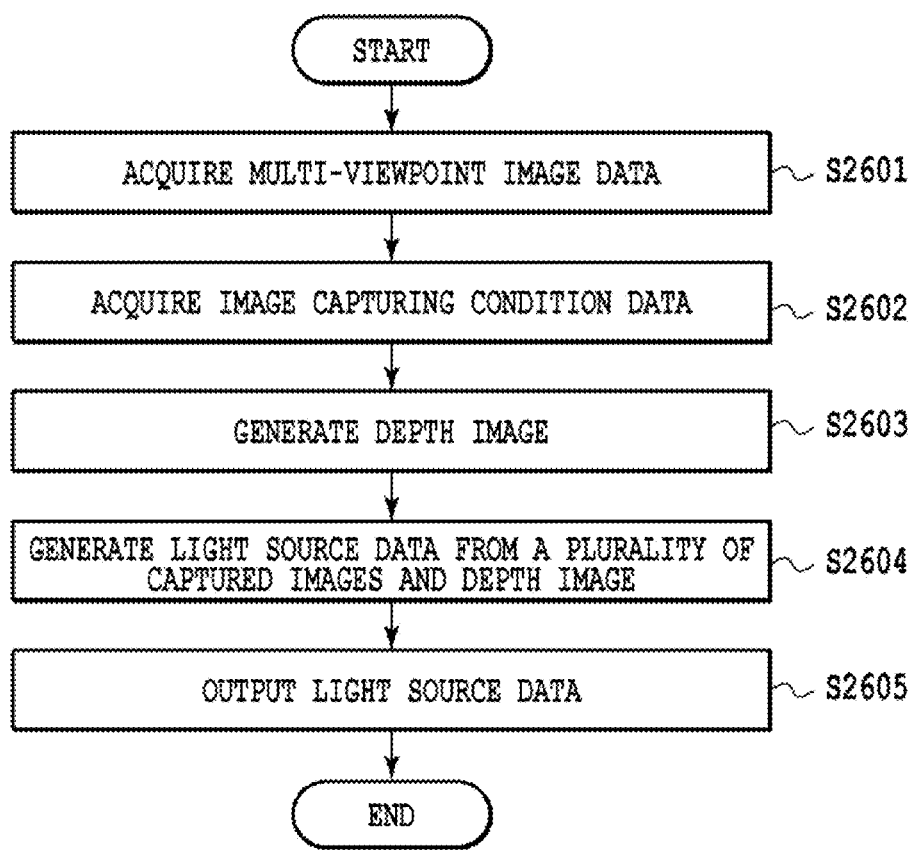
FIG. 26 is a flowchart showing a flow of light source estimation processing in the sixth embodiment.

FIG. 26 is a flowchart showing a flow of light source estimation processing in the present embodiment.

At step 2601, the image data acquiring unit 201 acquires multi-viewpoint image data having been subjected to predetermined image processing from the signal processing unit 103. The acquired multi-viewpoint image data is sent to the depth image generating unit 2501 and the light source data deriving unit 205.

At step 2602, the image capturing condition data acquiring unit 203 acquires image capturing condition data from the operation unit 111 etc. The acquired image capturing condition data is sent to the depth image generating unit 2501 and the light source data deriving unit 205.

At step 2603, the depth image generating unit 2501 generates a depth image from the multi-viewpoint image data received from the image data acquiring unit 201 and the image capturing condition data corresponding to each of the plurality of captured images with different viewpoints. The widely known methods may be used to generate a depth image and mention is made of, for example, the method described in the fourth modification example in Japanese Patent Laid-Open No. 2009-165115. Here, a case where a depth image is generated from two images is explained as an example.

Figure 27:
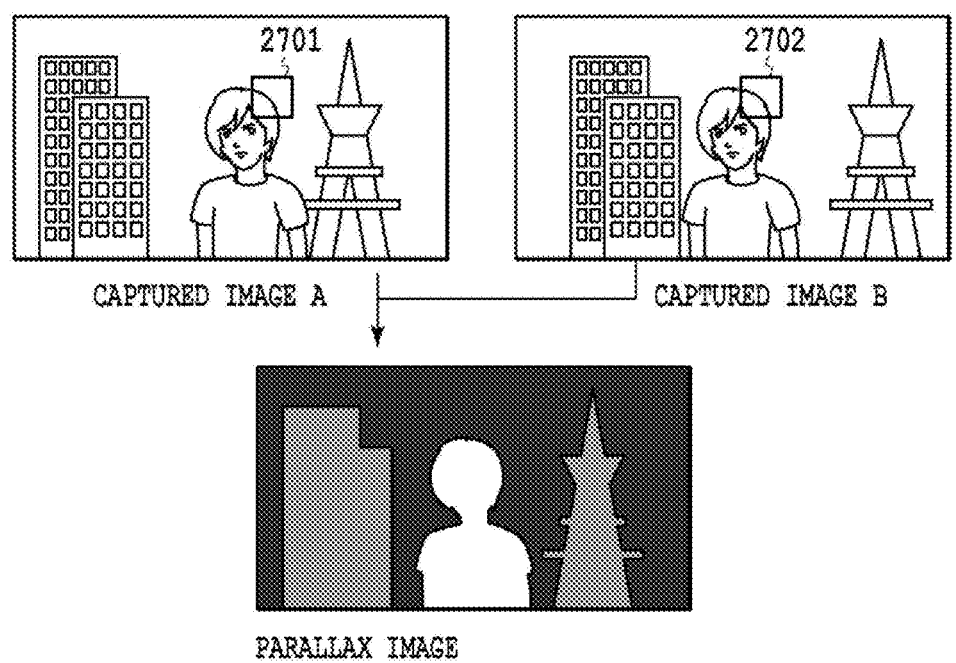
FIG. 27 is a conceptual diagram of parallax image derivation in the sixth embodiment.

At the time of generation of a depth image, first, a parallax image is generated based on two captured images with different viewpoints. FIG. 27 is a diagram showing a way a parallax image is generated from two captured images with different viewpoints. In each of an image A and an image B, there are a person, a tower, and buildings as subjects. First, a region a predetermined size (for example, 11×11 pixels) is set for each pixel position of the captured image A and a region having high correlation with the region is searched for from the captured image B. Here, the pixel position at the center of the region in the captured image B having high correlation with the region whose center is a pixel position (xA, yA) of the captured image A is taken to be (xB, yB). In the case where the subject is at a finite distance, (xA, yA) and (xB, yB) do not agree with each other and a deviation occurs. It is known that this pixel deviation becomes smaller as the distance of the subject increases. Consequently, a parallax image is obtained by calculating a pixel deviation amount dx and by allocating the calculated pixel deviation amount dx to each pixel position of the captured image A. In this case, the pixel deviation amount dx is expressed by the following formula.

$$dx = \sqrt{(xA-xB)^2 + (yA-yB)^2}$$

In the parallax image shown in FIG. 27, the person whose pixel deviation amount dx is the largest is represented in white, the tower and buildings whose pixel deviation amount dx is the second largest are represented in light gray, and the background whose pixel deviation amount dx is the smallest is represented in dark gray.

After parallax image data is obtained, the parallax image data is converted into depth image data based on the image capturing condition data. The method for converting a pixel deviation amount into a distance in accordance with the cameral characteristic values is widely known; therefore, a case of simple geometry is explained. In FIG. 27 described previously, it is assumed that the subject located at the center of the captured image A is located in a position deviated by the pixel deviation amount dx in the horizontal direction in the captured image B. Here, a number M of horizontal pixels and a field angle θ of the camera are acquired from the image capturing condition data and further, a distance D between the optical center of the captured image A and the optical center of the captured image B is derived from the position data of the camera. Then, in accordance with the following formula (5), the pixel deviation amount dx is converted into a distance L (depth value) to the subject.

$$L = D/\tan(\theta dx/M)$$

Figure 28:
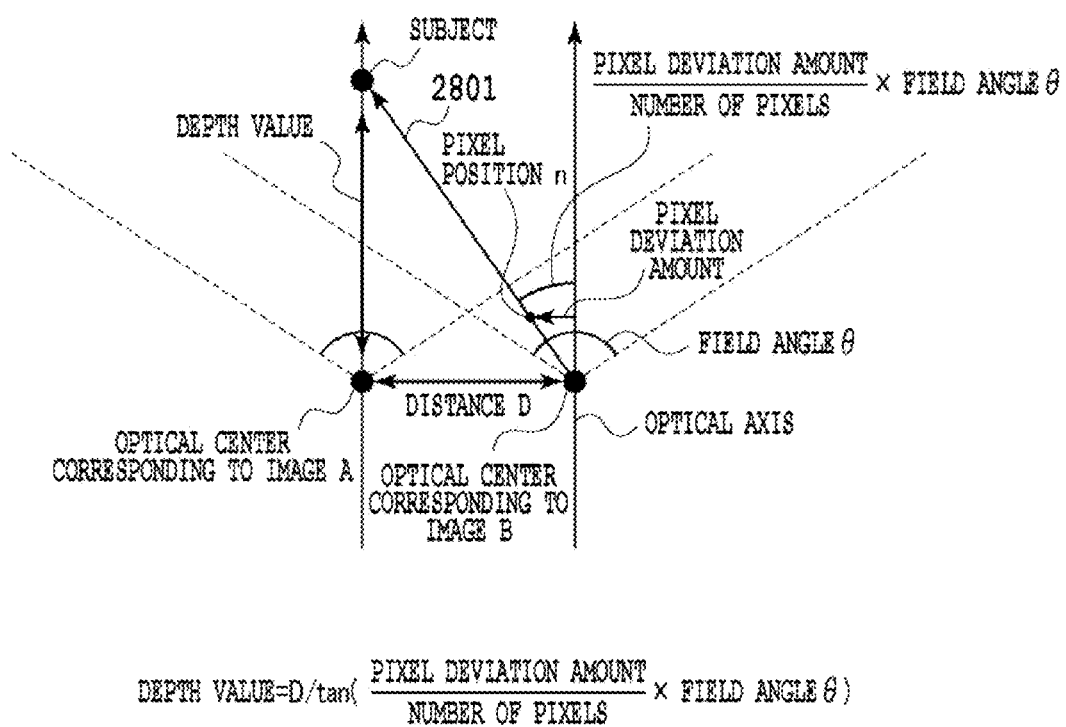
FIG. 28 is a conceptual diagram of conversion from a pixel deviation amount to a depth value in the sixth embodiment.

FIG. 28 is a diagram showing that the distance (depth value) to the subject is derived by the formula (5) described above.

In this manner, the depth image corresponding to the captured image A is generated. In the above-described explanation, it is needless to say that a depth image corresponding to the captured image B is obtained by performing the processing after exchanging the roles of the captured image A and the captured image B.

In the manner described above, from multi-viewpoint image data and image capturing condition data, a depth image corresponding to each of captured images with different viewpoints is generated.

Explanation is returned to the flowchart in FIG. 26.

At step 2604, the light source data deriving unit 205 derives light source data from multi-viewpoint image data, image capturing condition data, and depth image data.

Figure 29:
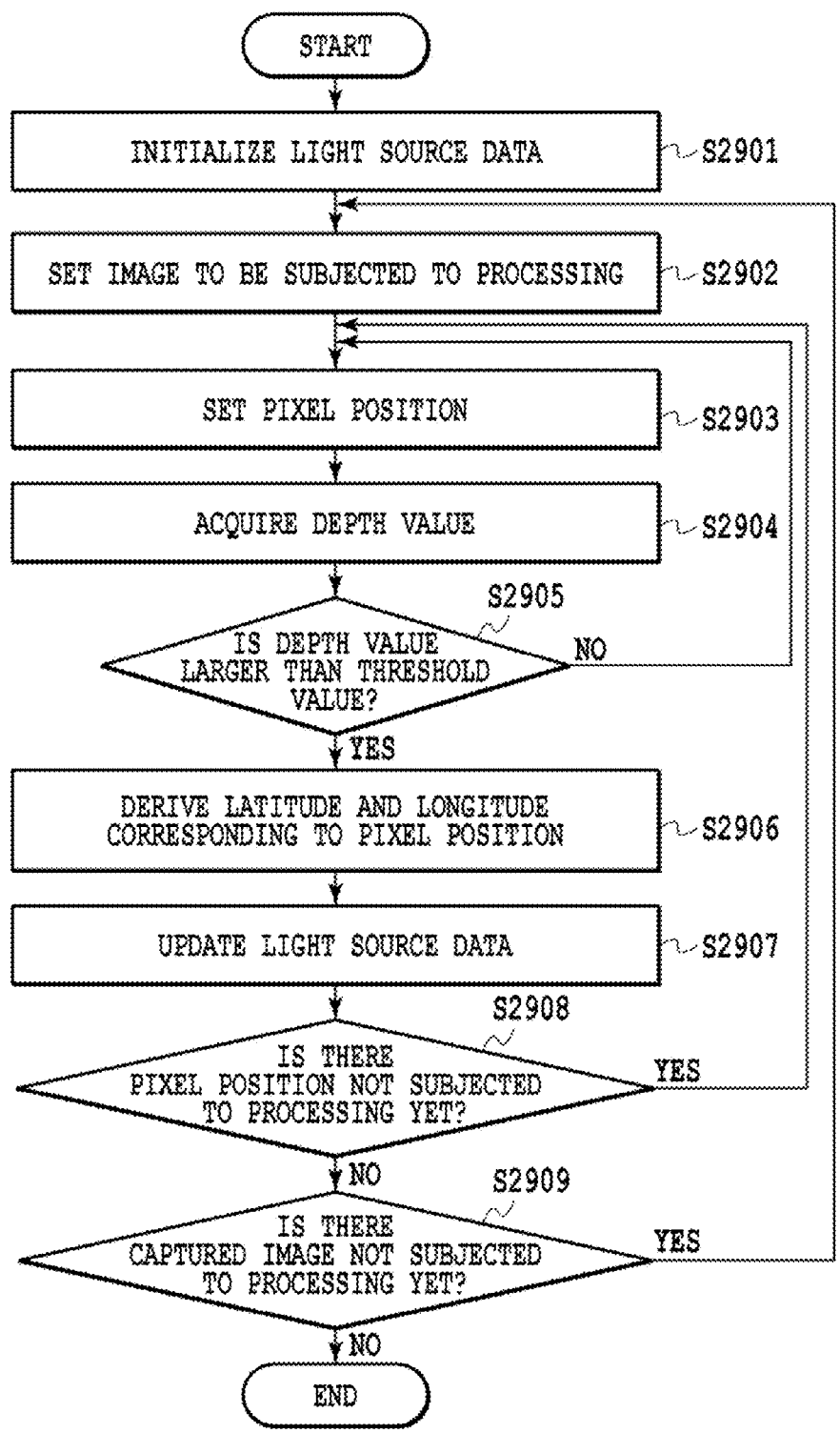
FIG. 29 is a detailed flowchart of step 2604 in the sixth embodiment.

FIG. 29 is a flowchart showing a flow of light source data derivation processing in the present embodiment.

At step 2901, the light source data deriving unit 205 initializes light source data. Specifically, the light source data deriving unit 205 sets a numerical value (for example, −1) etc. indicative of an unset state for the luminance values corresponding to all the latitudes and longitudes of the light source data.

At step 2902, the light source data deriving unit 205 sets a captured image to be subjected to processing from the multi-viewpoint image data.

At step 2903, the light source data deriving unit 205 sets a pixel position n that is referred to in the captured image set to be subjected to processing. For example, in the case where the pixel position at the top-left end of the image is set at first in the stage immediately after the start of processing, the pixel position n is sequentially updated to (n+1) and so on from the top-left end toward the below-right end in the subsequent processing, thus the new pixel position n is set.

At step 2904, the light source data deriving unit 205 acquires a depth value L (n) of the pixel position n in the depth image.

At step 2905, the light source data deriving unit 205 compares the acquired depth value L (n) and a threshold value determined in advance. As a result of comparison, in the case where the depth value L (n) is larger than the threshold value, the procedure proceeds to step 2906. On the other hand, in the case where the depth value L (n) is smaller than the threshold value, the procedure returns to step 2903 and the next pixel position is set.

Figure 30B:
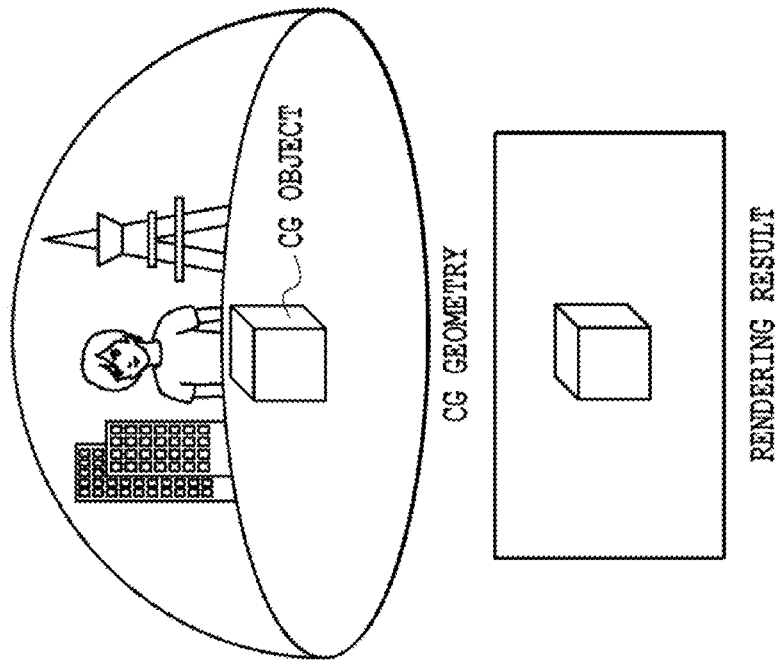
FIG. 30A is a diagram showing an example of a CG rendering result in the case where a captured image including only a subject that can be regarded as located at an infinite distance is used as light source data and FIG. 30B is a diagram showing an example of a CG rendering result in the case where a captured image including a subject that cannot be regarded as located at an infinite distance is used as light source data.
Figure 30A:
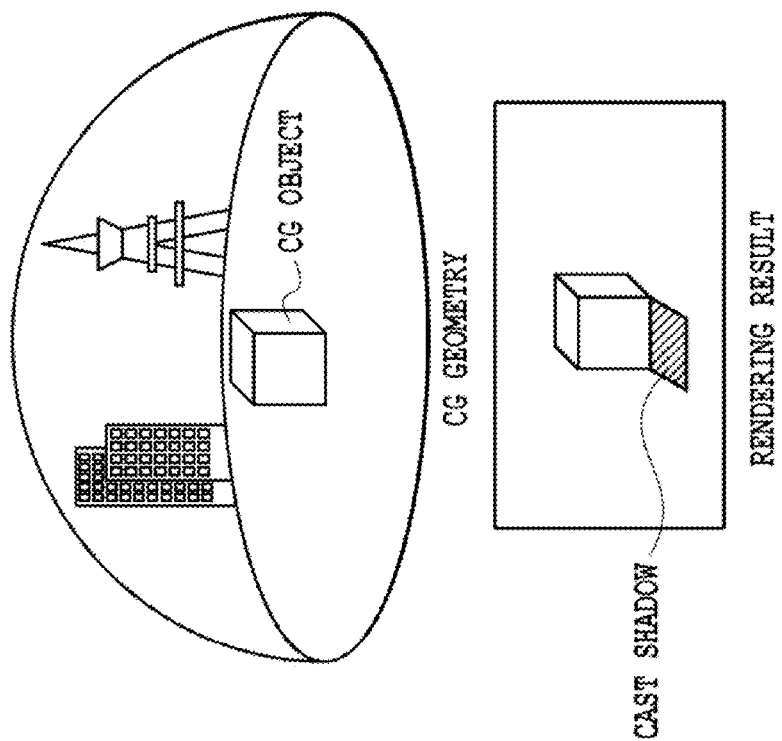

Here, the reason that processing is switched in accordance with the depth value is explained. As light source data generally used in a CG, there is an infinitely distant light source map. The infinitely distant light source map is a format to specify the luminance of a light source only by the direction (latitude, longitude) on the assumption that the light source is located at an infinite distance. In the case where obeying this format, the use of a captured image having an image region that cannot be regarded as an infinitely distant image region for light source data may lead to a strong possibility that the result of combination is an unnatural one. Consequently, it is advisable to avoid the use of the captured image including the image region that cannot be regarded as an infinitely distant image region for the light source data. Because of this, based on the depth image, an image region not suitable to the light source data is excluded from the captured image. FIG. 30A shows an example of a CG rendering result in the case where a captured image including only subjects that can be regarded as infinitely distant subject is used for light source data; and FIG. 30B shows an example of a CG rendering result in the case where a captured image including subjects that cannot be regarded as infinitely distant subjects is used for light source data, respectively. Then, on each rendering result in FIGS. 30A and 30B, CG geometry that makes use of light source data is shown, and the light source data surrounding the cube of the CG object is made visible and represented by a doom. From a comparing of both, in FIG. 30A, it is seen that the shadow of the cube, which is the CG object, is cast in the rendering result because light enters between the tower and the buildings. The same shadow is cast in the case where the real cube is placed in the real environment in which light source data is acquired, and therefore, it can be said that FIG. 30A shows the CG rendering result representing reality. In contrast to this, in FIG. 30B, the light that should enter between the buildings and the tower is blocked by the person, and therefore, the shadow of the cube, which is the CG object, is not cast. That is, it cannot be said that FIG. 30B shows the rendering result representing reality. Further, the light source data represents the luminance of incidence light at the position where image capturing is performed, therefore it is not preferable for the data of the person not relating to the lighting environment at that position to be reflected in the light source data. It is preferable to enable for a user to vary the distance to be regarded as an infinite distance by the setting. For example, in the case where the threshold value described above is set to 10 m, the light source data is generated by using the image region where the depth value L(n) is larger than 10 m.

Explanation is returned to the flowchart in FIG. 29.

Figure 41:
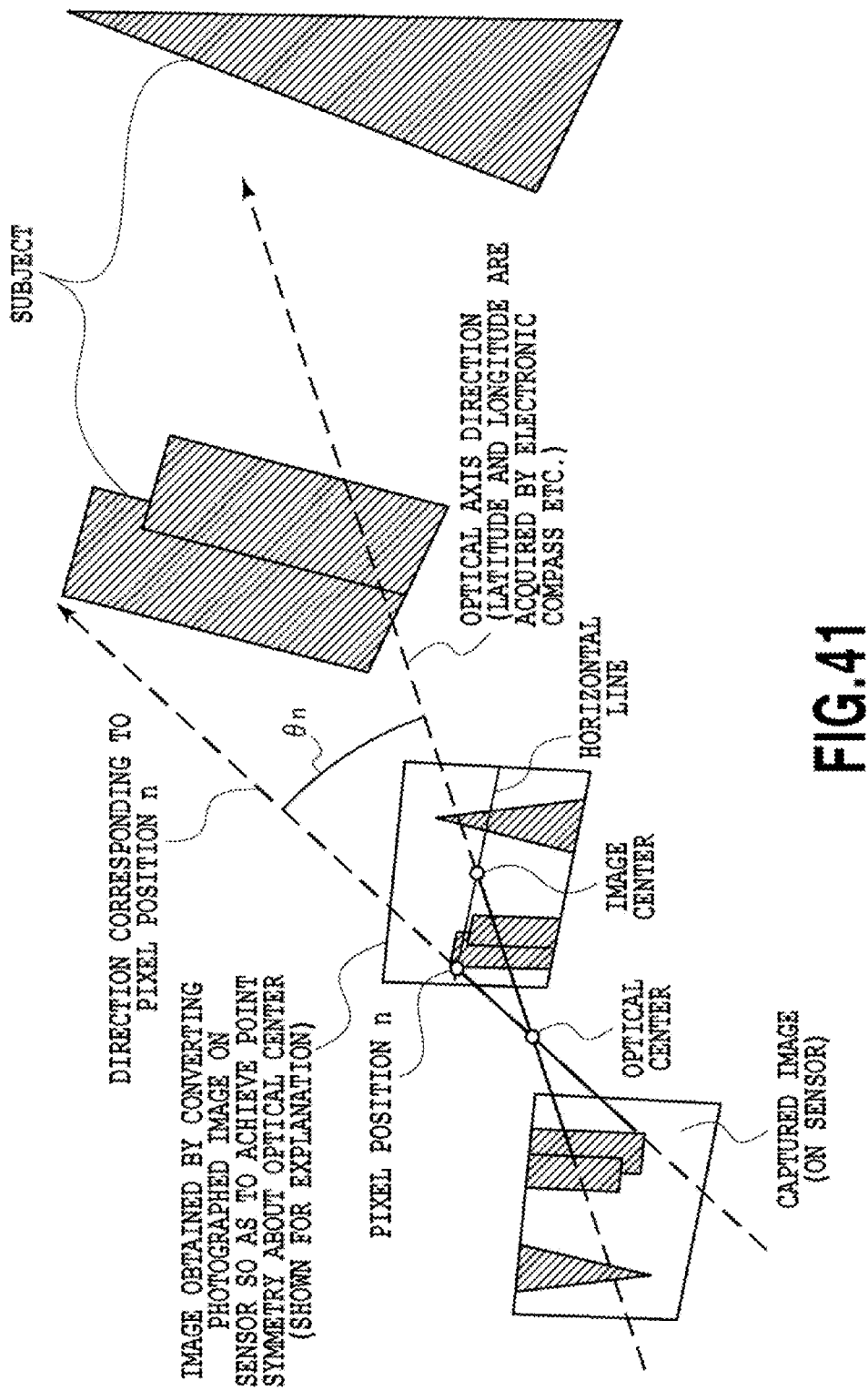
FIG. 41 is a diagram showing a relationship between a pixel position and a direction corresponding to the pixel position.

At step 2906, the light source data deriving unit 205 derives a direction (latitude, longitude) corresponding to the pixel position n from the image capturing condition data. FIG. 41 is a diagram showing a relationship between the pixel position n and a direction corresponding to the pixel position n. In this case, it is assumed that an optical axis direction is held in advance as image capturing condition data by acquiring the latitude and longitude using an electronic compass, gyro, horizon sensor, etc., built in a camera. Then, a direction corresponding to the pixel position n is found with the optical axis direction as a reference. In order to simplify explanation, it is assumed that the camera is placed horizontally. In this case, it is known from FIG. 41 that a direction corresponding to the pixel position n the height of which is the same as that of the image center is the optical axis direction θn rotated horizontally. The angle θn is found by (pixel deviation amount÷number of pixels)×field angle, where the field angle of the camera is taken to be θ. It is needless to say that information, such as the field angle and the number of pixels, is acquired from image capturing condition data.

At step 2907, the light source data deriving unit 205 sets a pixel value of the captured image at the pixel position n for the direction (latitude, longitude) corresponding to the pixel position n derived at step 2906.

At step 2908, the light source data deriving unit 205 determines whether the processing is performed for all the pixel positions of the captured image set to be subjected to processing. In the case where the processing is completed for all the pixel positions, the procedure proceeds to step 2909. On the other hand, in the case where there is a pixel position not subjected to the processing yet, the procedure returns to step 2903 and the next pixel position is set.

At step 2909, the light source data deriving unit 205 determines whether the processing is completed for all the captured images included in the multi-viewpoint image data. In the case where there is a captured image not subjected to the processing yet, the procedure returns to step 2902 and the next captured image is set as the image to be subjected to the processing, and the processing at step 2902 to step 2908 is repeated. On the other hand, in the case where the processing is completed for all the captured images, this processing is exited.

In the manner described above, light source data corresponding to an image capturing environment is generated from multi-viewpoint image data and image capturing condition data.

In the present embodiment, for the sake of simplicity, the case where the number of images captured from different viewpoints is two is explained as an example, however, as a matter of course, it is also possible to acquire more multi-viewpoint images and generate light source data by performing the processing described above using two or more captured images.

Explanation is returned to the flowchart in FIG. 26.

At step 2605, the light source data output unit 206 outputs the light source data generated at step 2604. As the output method, it may also be possible to record the light source data at the header of the image data to be saved or to generate and save a light source data file separately from the image file.

As described above, according to the invention of the present embodiment, it is possible to derive light source data from data of a captured image.

Seventh Embodiment

In the sixth embodiment in which light source data is derived by obtaining the depth image based on the parallax found from the plurality of captured images, it is not possible to obtain a depth image in the case where there is only one captured image. Here, an aspect is explained as a seventh embodiment, in which a depth image is generated from one captured image in a pseudo manner. Explanation of parts common to those of the sixth embodiment is simplified or omitted and here, different points are explained mainly.

The flow of light source estimation processing in the present embodiment is similar to that of the flowchart in FIG. 26 according to the sixth embodiment; therefore explanation is given along the flow in FIG. 26.

At step 2601, the image data acquiring unit 201 acquires data of one captured image having been subjected to predetermined image processing from the signal processing unit 103. The acquired image data is sent to the depth image generating unit 2501 and the light source data deriving unit 205.

At step 2602, the image capturing condition data acquiring unit 203 acquires image capturing condition data from the operation unit 111 etc. The acquired image capturing condition data is sent to the depth image generating unit 2501 and the light source data deriving unit 205.

At step 2603, the depth image generating unit 2501 generates a depth image from the data of one captured image received from the image data acquiring unit 201 and the image capturing condition data corresponding to the captured image.

As explained in the sixth embodiment, it is not appropriate to use the captured image including the image region that cannot be regarded as an infinitely distant image region for the light source data as it is. Consequently, in the case where a depth image is generated from one captured image, it is also necessary to remove a subject located at a short distance. In the present embodiment, in the case where a captured image includes a subject (here, a person) located within a specific distance, a depth image is generated by regarding only the regions of subjects other than the subject as infinitely distant regions. Specifically, a depth image is generated as follows.

First, the depth image generating unit 2501 performs processing to detect the face region of the person for the captured image. To detect the face region, a face detection technique widely known may be used. Face detection techniques include, for example, a method that makes use of pattern matching, in which partial images are cut out at a plurality of different positions on the captured image, whether or not the partial image is the image of the face region is determined, and thus, the face region on the captured image is detected.

Next, distance information is set by, for example, taking a predetermined region including the detected face region to be a reference and by setting the distance to the outside of the reference region as a great distance (for example, 1 km) that can be regarded as an infinite distance and the distance to the inside thereof as a short distance (1 m), and so on, and thus, a depth image is obtained. In this case, the predetermined region may be set, for example, to a circular region having an area double the area of the detected face region.

As described above, by detecting the face region in the captured image and handling a fixed region including the detected face region as an image region at a short distance, a depth image is approximately generated from one captured image. In the present embodiment, the case is explained, where the person is detected as a subject located at a short distance; however, for example, it may also be possible to detect an animal, such as a dog, a building, etc., by pattern matching etc. and to regard the outside of the detected animal or building as an infinitely distant region.

At step 2604, the light source data deriving unit 205 derives light source data from the data of one captured image, the image capturing condition data, and the depth image obtained in the manner described above. The light source data derivation processing in this case is the same as that explained in the sixth embodiment except in that only one captured image is to be subjected to processing.

As a modification example of the sixth embodiment, it may also be possible to add information indicative of a region used as light source data to the captured image based on the detection result of the face region etc. without generating a depth image in a pseudo manner. In this case, at step 2905 of the flowchart in FIG. 29, whether the pixel position n is in the set region is determined as a result, and in the case where it is determined that the pixel position n is in the region, the procedure is caused to proceed to step 2906, and thus, light source data is derived.

Eighth Embodiment

Next, an aspect is explained as an eighth embodiment, in which light source data is derived with high precision by excluding a cast shadow region in a captured image. Explanation of parts common to those of the other embodiments is simplified or omitted and here, different points are explained mainly.

Figure 31:
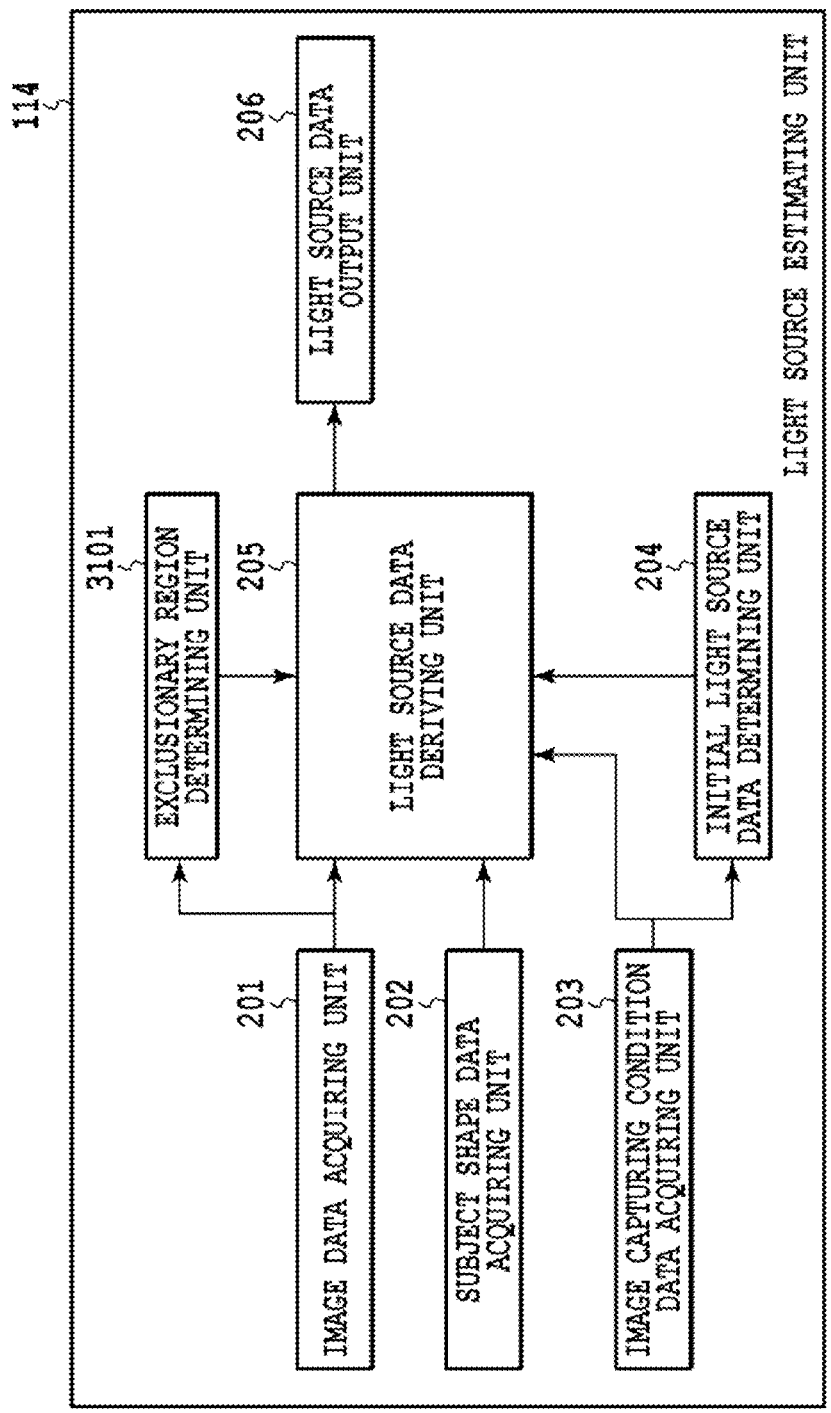
FIG. 31 is a function block diagram showing an internal configuration of a light source estimating unit according to an eighth embodiment.

FIG. 31 is a function block diagram showing an internal configuration of the light source estimating unit 114 according to the present embodiment. The light source estimating unit 114 differs largely from the light source estimating unit 114 according to the first embodiment (see FIG. 2) in that an exclusionary region determining unit 3101 is added.

The exclusionary region determining unit 3101 performs processing to extract cast shadow regions in an image and determine a region of the extracted cast shadow regions that is in contact with the edge part of the image as an exclusionary region not used in light source estimation.

Figure 32:
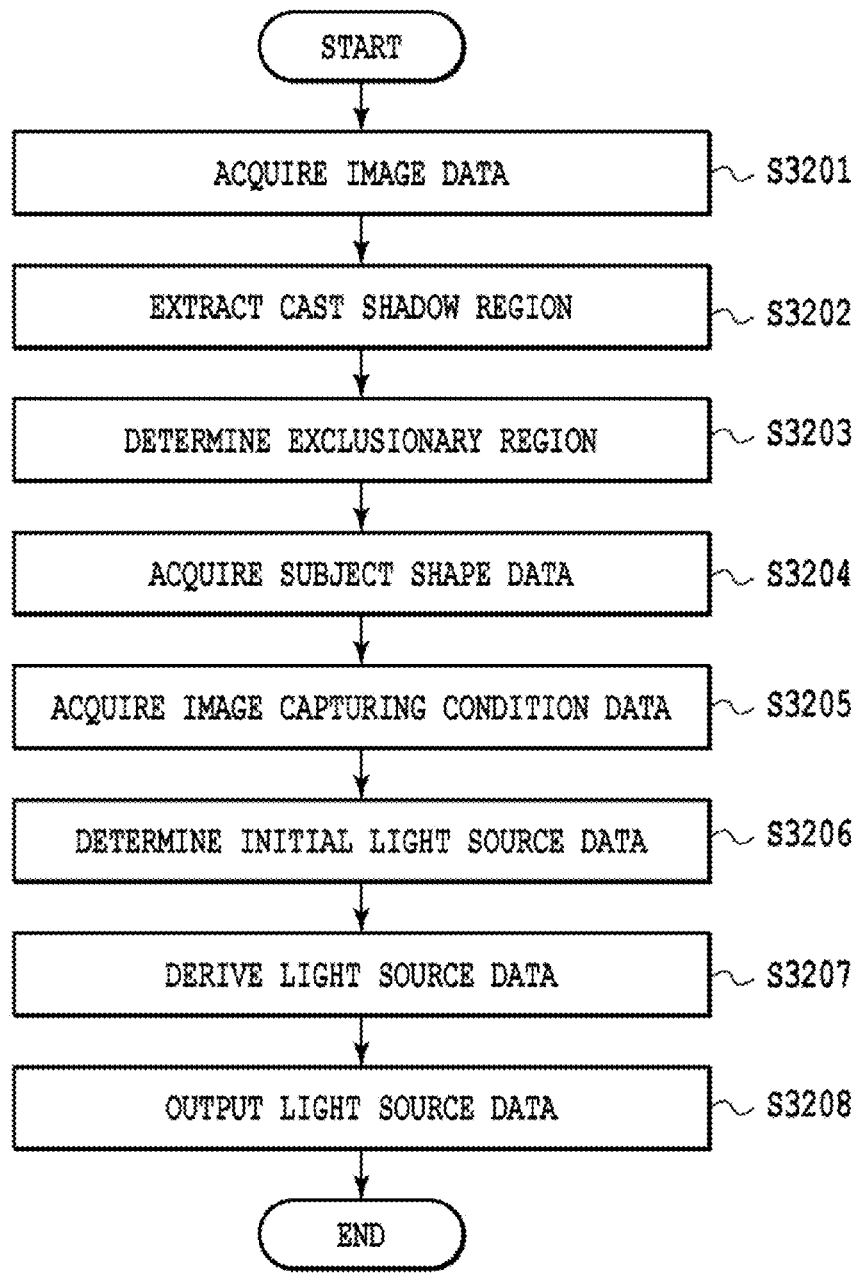
FIG. 32 is a flowchart showing a flow of light source estimation processing in the eighth embodiment.

FIG. 32 is a flowchart showing a flow of light source estimation processing in the present embodiment.

At step 3201, the image data acquiring unit 201 acquires image data having been subjected to predetermined image processing from the signal processing unit 103. The acquired image data is sent to the light source data deriving unit 205 and the exclusionary region determining unit 3101.

At step 3202, the exclusionary region determining unit 3101 performs cast shadow region extraction processing on the received image data. Methods for extracting a cast shadow region from a captured image are widely known, and for example, it is possible to extract using the XYZ values of the image. Specifically, after the RGB values are converted into chromaticities XYZ based on the used color space profile of the captured image, a pixel region whose luminance value $Y < Y_{th}$ (for example, $Y_{th}=80$) is extracted as a cast shadow region. There are other methods, such as the background difference method and a method that makes use of a change in lightness; however, explanation thereof is omitted here.

Figure 33:
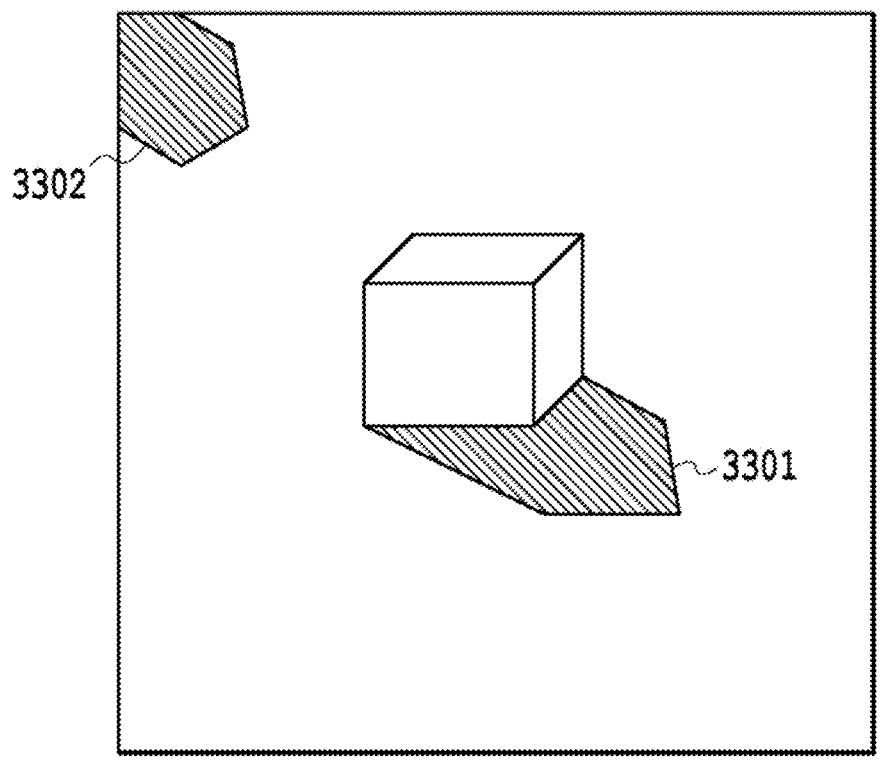
FIG. 33 is a diagram showing an example of an exclusionary region.

At step 3203, the exclusionary region determining unit 3101 determines a pixel region not used in light source estimation (hereinafter, called an "exclusionary region") of the cast shadow regions extracted at step 3202. Whether a region is regarded as an exclusionary region is determined by checking whether the extracted cast shadow region is in contact with the edge part of the captured image and by regarding the shadow as cast by an object not included in the image in the case where the cast shadow region is in contact with the edge part of the image. FIG. 33 is a diagram showing an example of an exclusionary region. In FIG. 33, two cast shadow regions 3301 and 3302 are shown and the cast shadow region 3302 is in contact with the top-left edge part of the image. In this case, the cast shadow region 3302 is determined as an exclusionary region as a result.

Figure 34:
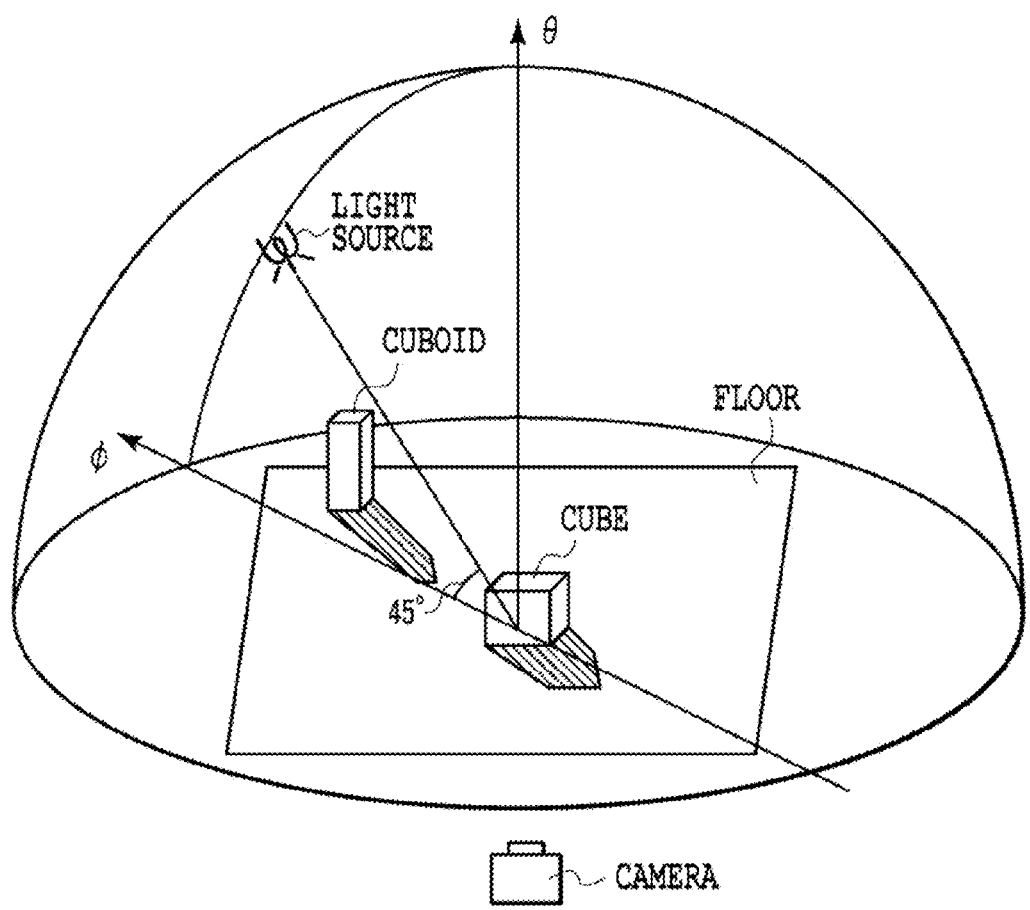
FIG. 34 is a diagram showing a state of a camera capturing an image in a scene in which a light irradiates a cuboid and a cube placed on a floor.
Figures 35A, 35B, 35C:
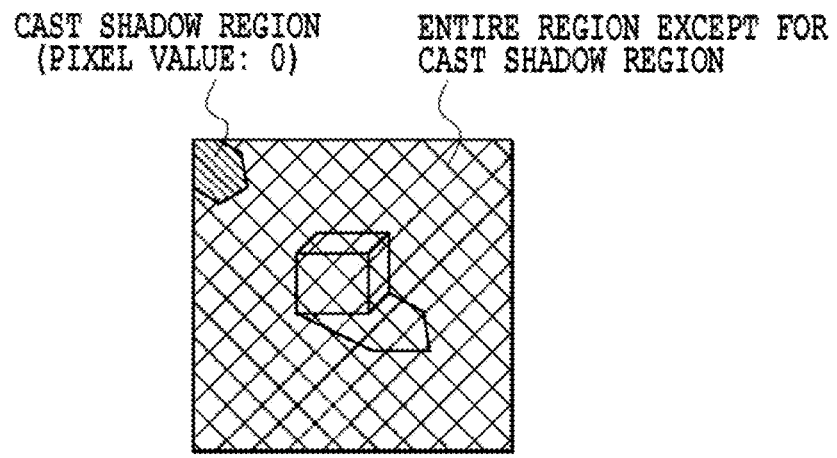
FIG. 35A shows a diagram showing an example of a captured image.
FIG. 35B is a diagram showing an example of light source data derived using only a cast shadow region of the captured image.
FIG. 35C is a diagram showing an example of light source data derived using the whole region except for the cast shadow region of a pixel region of the captured image.
Figure 36A:
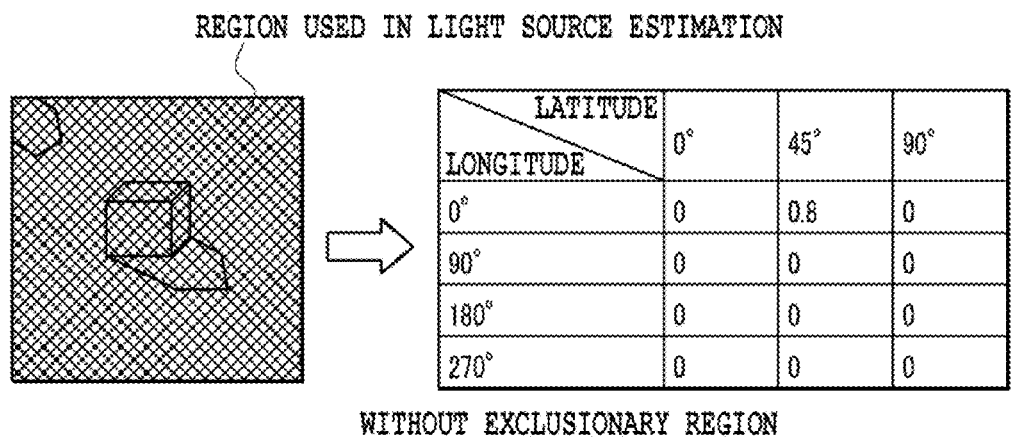
FIG. 36A is a diagram showing an example of light source data derived in the case where there is no exclusionary region and FIG. 36B is a diagram showing an example of light source data derived in the case where there is an exclusionary region.
Figure 36B:
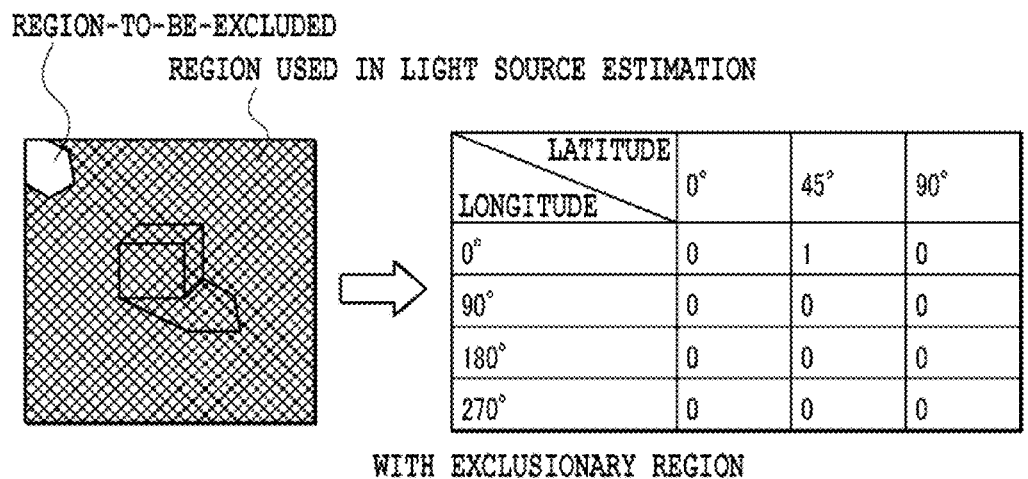

Here, the reason that light source data can be derived with high precision by excluding a cast shadow region at the edge part of an image is explained. FIG. 34 is a diagram showing a way the image of a scene, in which a cuboid and a cube arranged on a floor are irradiated with light having a luminance of 1 (lux) from the direction of a point at 45° latitude and 0° longitude, is captured by a camera. Now, a case is considered where light source data is derived from the image captured in such a state. Here, it is assumed that reflection is Lambert reflection in which the luminance of light reflected from the floor, the cuboid, and the cube is uniform with respect to the emission direction and the reflectance is 1. In the present embodiment, in order to simplify explanation, a case of a white-and-black image with one channel is explained; however, in a case where a color image is used, it is sufficient to perform the same processing for each of the three channels of R, G, and B. FIG. 35A shows a captured image including a cube and its cast shadow at the center of the image and a shadow cast caused by a cuboid at the top-left part of the image. First, a case is considered where light source data is derived using only the cast shadow region produced by the cuboid of the pixel region of the captured image. In this case, there is Lambert reflection from the floor and the pixel value in a cast shadow region A is 0, and therefore, light source data that is derived will be light source data in which light intensity is 0 (lux) in all the latitude and longitude directions (see FIG. 35B). Next, a case is considered where light source data is derived using the entire region except for the cast shadow region of the pixel region of the captured image. At this time, in the light source estimation processing explained in the first embodiment (see the flowchart in FIG. 9), light source data is derived, with which the error $\Delta_i$ between the CG image and the captured image, in which the cube is irradiated with light having a luminance of 1 (lux) from the direction of a point at 45° latitude and 0° longitude, will be smaller than a predetermined threshold value. That is, the light source data that is derived will be light source data in which the light intensity in the direction of a point at 45° latitude and 0° longitude is 1 (lux) as shown in FIG. 35C. As described above, it is known that the light source data obtained from the cast shadow region and the light source data obtained from the entire region except for the case cast shadow region differ largely from each other. FIGS. 36A and 36B show light source data that is derived in the case where there is no region-to-be-excluded and in the case where there is a region-to-be-excluded. FIG. 36A shows the light source data that is derived in the case where there is no exclusionary region (in the case where light source estimation is performed using the entire pixel region in the image), light source data in which the light intensity in the direction of a point at 45° latitude and 0° longitude is 0.8 (lux). On the other hand, FIG. 36B shows the light source data that is derived in the case where there is an exclusionary region (in the case where light source estimation is performed using the pixel region excluding the cast shadow region in the captured image), light source data in which the light intensity in the direction of a point at 45° latitude and 0° latitude is 1.0 (lux). As is obvious from comparison of both, the light source data of the image capturing scene is derived with higher precision in the case where there is an exclusionary region.

In the present embodiment, the cast shadow region including the edge part of the captured image is regarded as a shadow cast by an object not included in the captured image and determined as an exclusionary region; however, it may also be possible to apply the already existing object recognition technique to the captured image and to determine the cast shadow region not in contact with the subject recognized as a solid as an exclusionary region. Further, it may also be possible to enable a user to specify a region that the user does not intend to use in light source estimation on a UI.

The processing at subsequent step 3204 to step 3206 is the same as that at step 502 to step 504 of the flowchart in FIG. 5 according to the first embodiment, and therefore, explanation thereof is omitted here.

At step 3207, the light source data deriving unit 205 derives light source data most suitable to the scene based on the acquired image data, the subject shape data, the image capturing condition data, and the determined initial light source data. The light source data derivation processing in the present embodiment is also basically the same as that of the flowchart in FIG. 9 according to the first embodiment; however, the processing at step 903 is different. That is, in the present embodiment, in the case where the error $\Delta_i$ between the CG image and the captured image is found, the error $\Delta_i$ from the CG image is found using the pixel region except for the exclusionary region (the pixel region, which is the entire pixel region of the captured image from which the exclusionary region is excluded) as a result.

At step 3208, the light source data output unit 206 outputs the derived light source data.

As described above, according to the invention of the present embodiment, it is possible to derive light source data with higher precision by excluding a cast shadow region in a captured image and by not using the cast shadow region in light source estimation.

Ninth Embodiment

In the eighth embodiment, the cast shadow region in contact with the edge part of the image of the cast shadow regions included in the captured image is determined as the exclusionary region not used in light source estimation. However, in a shooting scene in which light enters obliquely, such as a sunset scene, or in a shooting scene in which a main subject is included at the edge part of the image, etc., the shadow cast by the main subject included in the captured image also comes into contact with the edge part of the image, therefore it is difficult to appropriately determine an exclusionary region. Because of this, an aspect is explained as a ninth embodiment, in which an exclusionary region is determined using initial light source data so that it is possible to appropriately determine an exclusionary region also in the image captured in such a shooting scene described above. Explanation of parts common to those of the other embodiments is simplified or omitted and here, different points are explained mainly.

Figure 37:
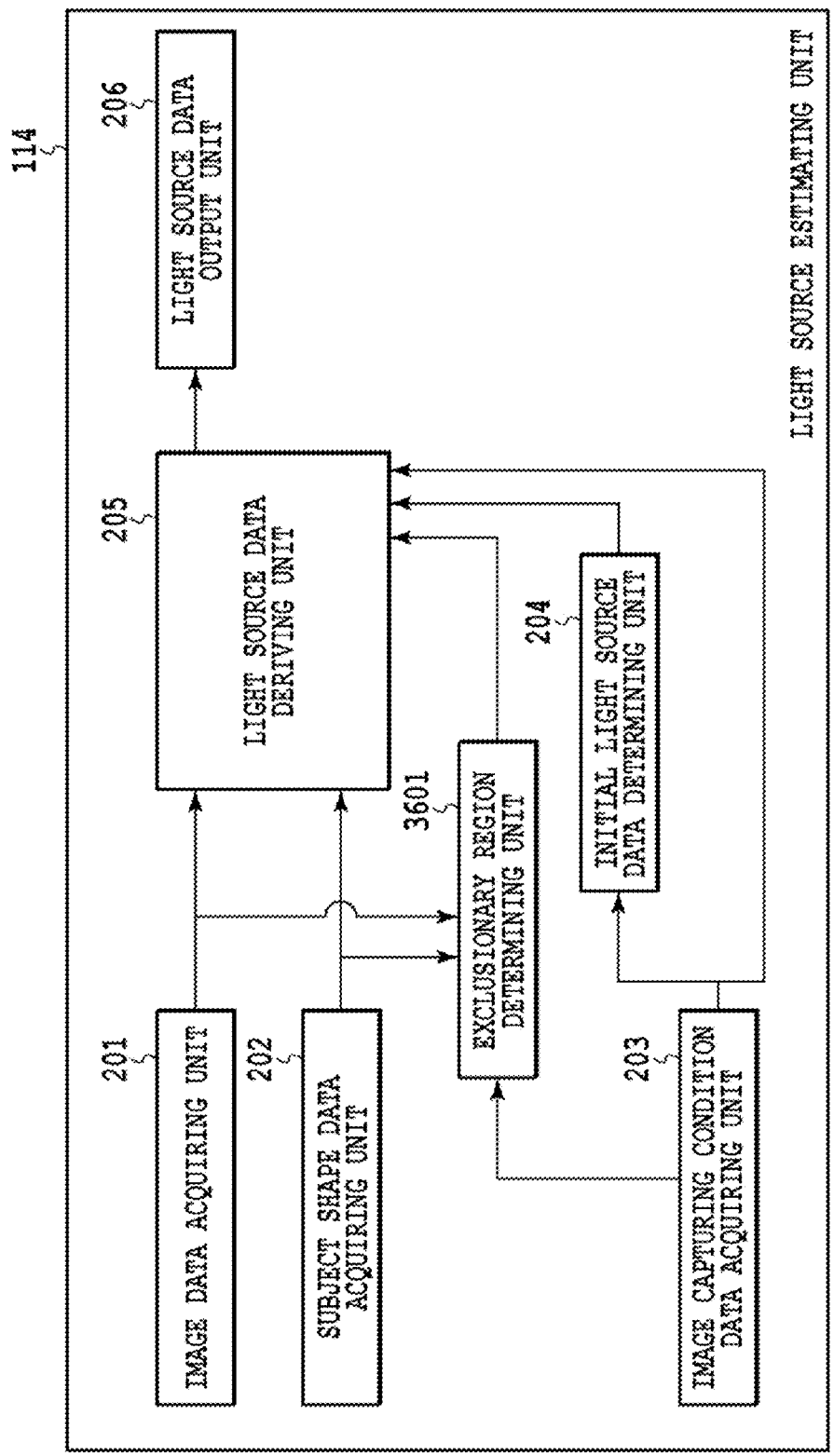
FIG. 37 is a function block diagram showing an internal configuration of a light source estimating unit according to a ninth embodiment.

FIG. 37 is a function block diagram showing an internal configuration of the light source estimating unit 114 according to the present embodiment. The light source estimating unit 114 differs largely from the light source estimating unit 114 according to the eighth embodiment (see FIG. 31) in arrangement (relationship to other units) of an exclusionary region determining unit 3601. That is, the exclusionary region determining unit 3601 in the present embodiment acquires not only image data from the image data capturing unit 201 but also subject shape data, image capturing condition data, and initial light source data and uses to determine an exclusionary region.

Figure 38:
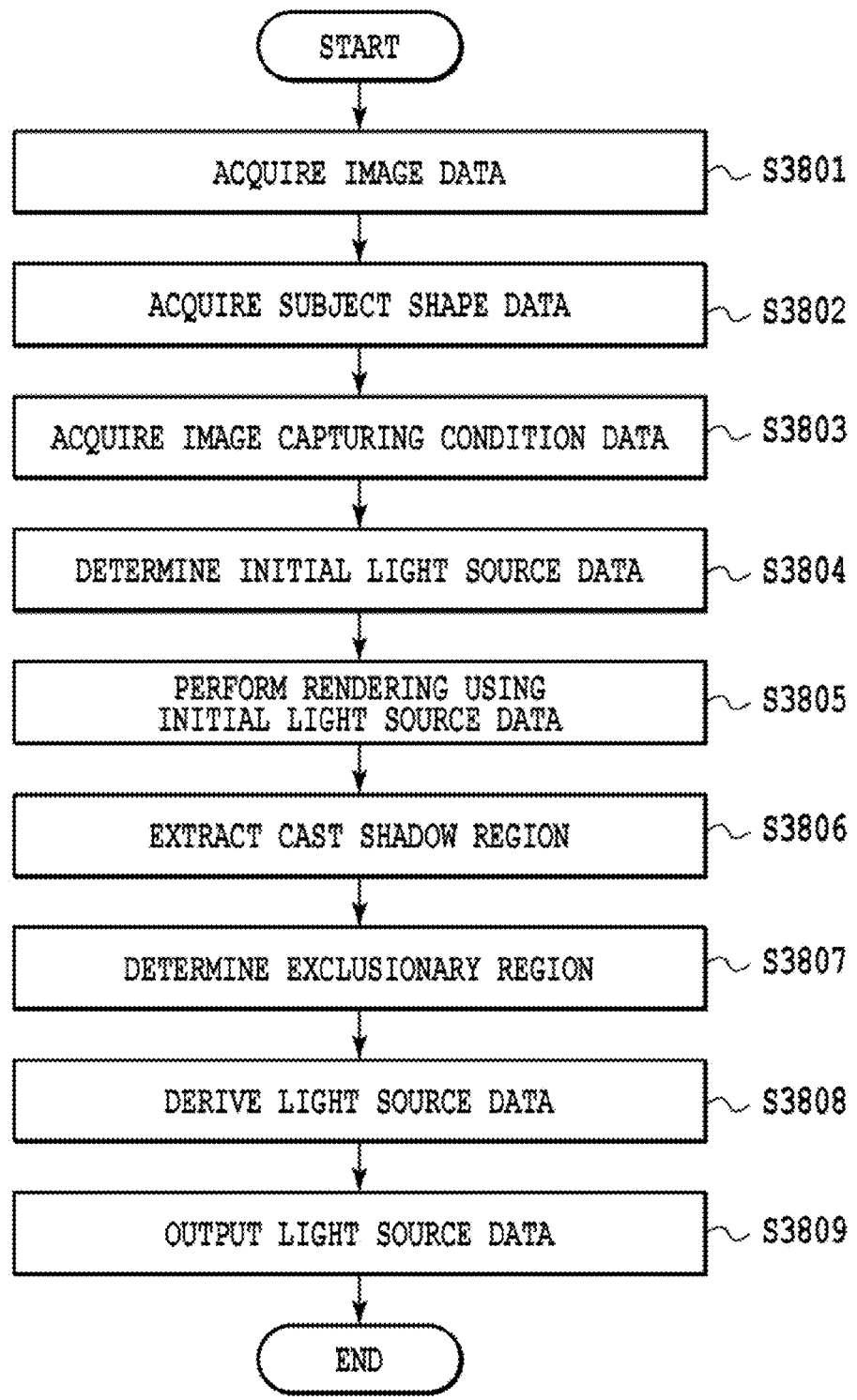
FIG. 38 is a flowchart showing a flow of light source estimation processing in the ninth embodiment.

FIG. 38 is a flowchart showing a flow of light source estimation processing in the present embodiment.

At step 3801, the image data acquiring unit 201 acquires image data having been subjected to predetermined image processing from the signal processing unit 103. The acquired image data is sent to the light source data deriving unit 205 and the exclusionary region determining unit 3601.

At step 3802, the subject shape data acquiring unit 202 acquires subject shape data. The acquired subject shape data is sent to the light source data deriving unit 205 and the exclusionary region determining unit 3601.

At step 3803, the image capturing condition data acquiring unit 203 acquires image capturing condition data from the operation unit 111 etc. The acquired image capturing condition data is sent to the initial light source data determining unit 204, the light source data deriving unit 205, and the exclusionary region determining unit 3601.

At step 3804, the initial light source data determining unit 204 determines initial light source data corresponding to the acquired image capturing condition data by referring to a light source data table saved in the ROM 108 etc.

Figure 39:
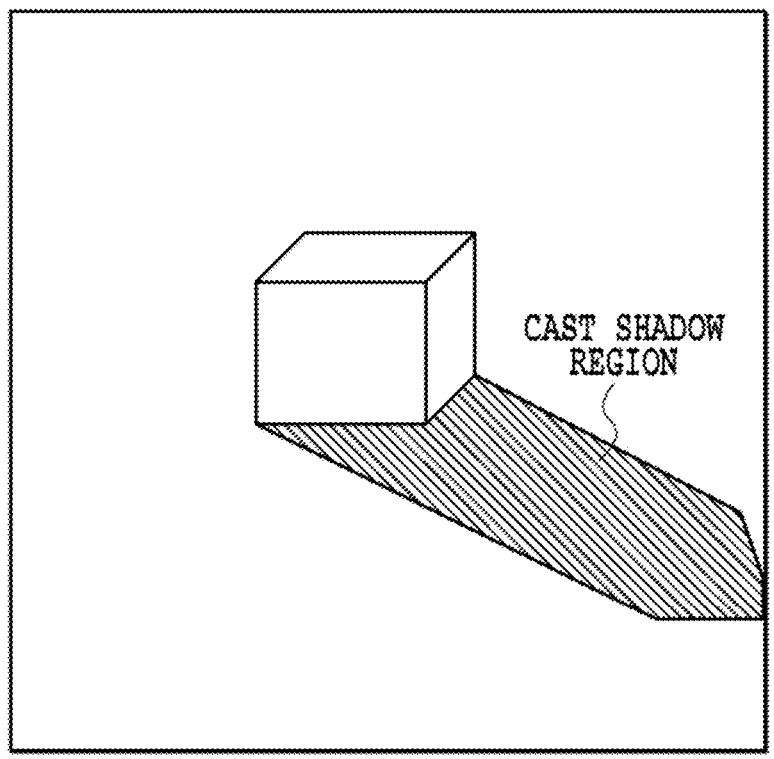
FIG. 39 is a diagram showing an example of a CG image generated by rendering.

At step 3805, the exclusionary region determining unit 3601 performs rendering based on the acquired image data, the initial light source data, the subject shape data, and the image capturing condition data to generate a CG image. FIG. 39 is a diagram showing an example of a CG image generated by rendering. The shadow cast caused by the cube located at the center of the screen is in contact with the below-right edge part of the image.

At step 3806, the exclusionary region determining unit 3601 performs cast shadow region extraction processing on the captured image acquired at step 3801 and the CG image generated at step 3805, respectively. Extraction of the cast shadow region is the same as that explained in the eighth embodiment (see step 3202 of the flowchart in FIG. 32).

Figure 40:
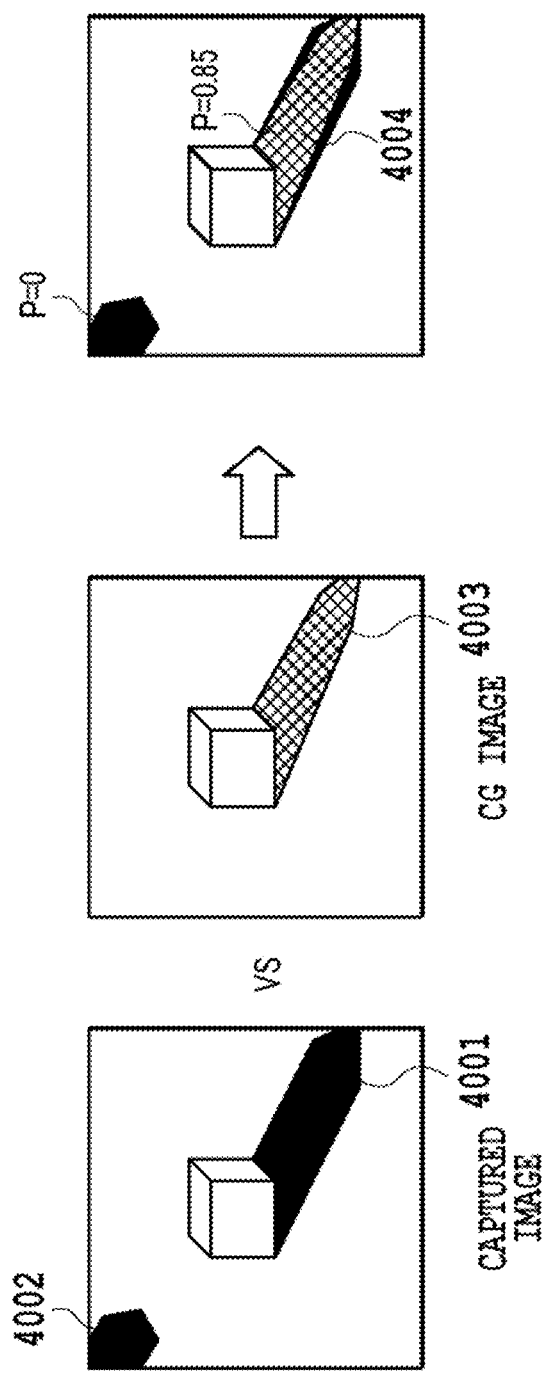
FIG. 40 is a diagram for explaining a process of determination of a region-to-be-excluded.

At step 3807, the exclusionary region determining unit 3601 calculates a ratio P of the area of the cast shadow region that overlaps that of the CG image to the area of the cast shadow region for each cast shadow region in the captured image. Then, the exclusionary region determining unit 3601 determines whether the calculated ratio P is smaller than a predetermined threshold value $P_{th}$ (for example, $P_{th}$=0.5) and determines the cast shadow region whose P satisfies $P<P_{th}$ as an exclusionary region not used in light source estimation. FIG. 40 is a diagram for explaining the process to determine an exclusionary region in the present embodiment. In FIG. 40, the ratio P of the area of a cast shadow region 4001 in the captured image that overlaps a cast shadow region 4003 in the CG image to the area of the cast shadow region 4001 is 0.85. On the other hand, there is no cast shadow region in the CG image that corresponds to a cast shadow region 4002 in the captured image, therefore the ratio=0. Consequently, in this case, although the cast shadow region 4001 in the captured image is in contact with the below-right edge part of the cast shadow region 4001 in the captured image, the calculated ratio P is larger than the threshold value $P_{th}$ (0.5), and therefore, the exclusionary region determining unit 3601 does not determine that the cast shadow region 4001 is an exclusionary region and only the cast shadow region 4002 is determined as an exclusionary region.

At step 3808, the light source data deriving unit 205 derives light source data optimum for the scene based on the acquired image data, the subject shape data, the image capturing condition data, and the determined initial light source data. The light source data derivation processing in the present embodiment is the same as that at step 3207 of the flowchart in FIG. 32 in the eighth embodiment. That is, in the case where the error $\Delta_i$ between the CG image and the captured image is found, the pixel region other than the exclusionary region (the entire pixel region of the captured image from which the exclusionary region is excluded) is used to find the error $\Delta_i$ from the CG image as a result.

At step 3809, the light source data output unit 206 outputs the derived light source data.

As described above, according to the invention of the present embodiment, it is made possible to derive light source data with high precision even from an image captured in a shooting scene of a sunset where light enters obliquely, or a captured image in which a subject is located at the edge part.

Tenth Embodiment

In the first embodiment, the aspect is explained, in which image capturing condition data is used in the case where the initial value for calculation of light source estimation is determined. Next, an aspect is explained as a tenth embodiment, in which in a case where a plurality of solution candidates is found in the calculation of light source estimation, one piece of light source data is determined by using image capturing condition data. Explanation of parts common to those of the other embodiments is simplified or omitted and here, different points are explained mainly.

Figure 42:
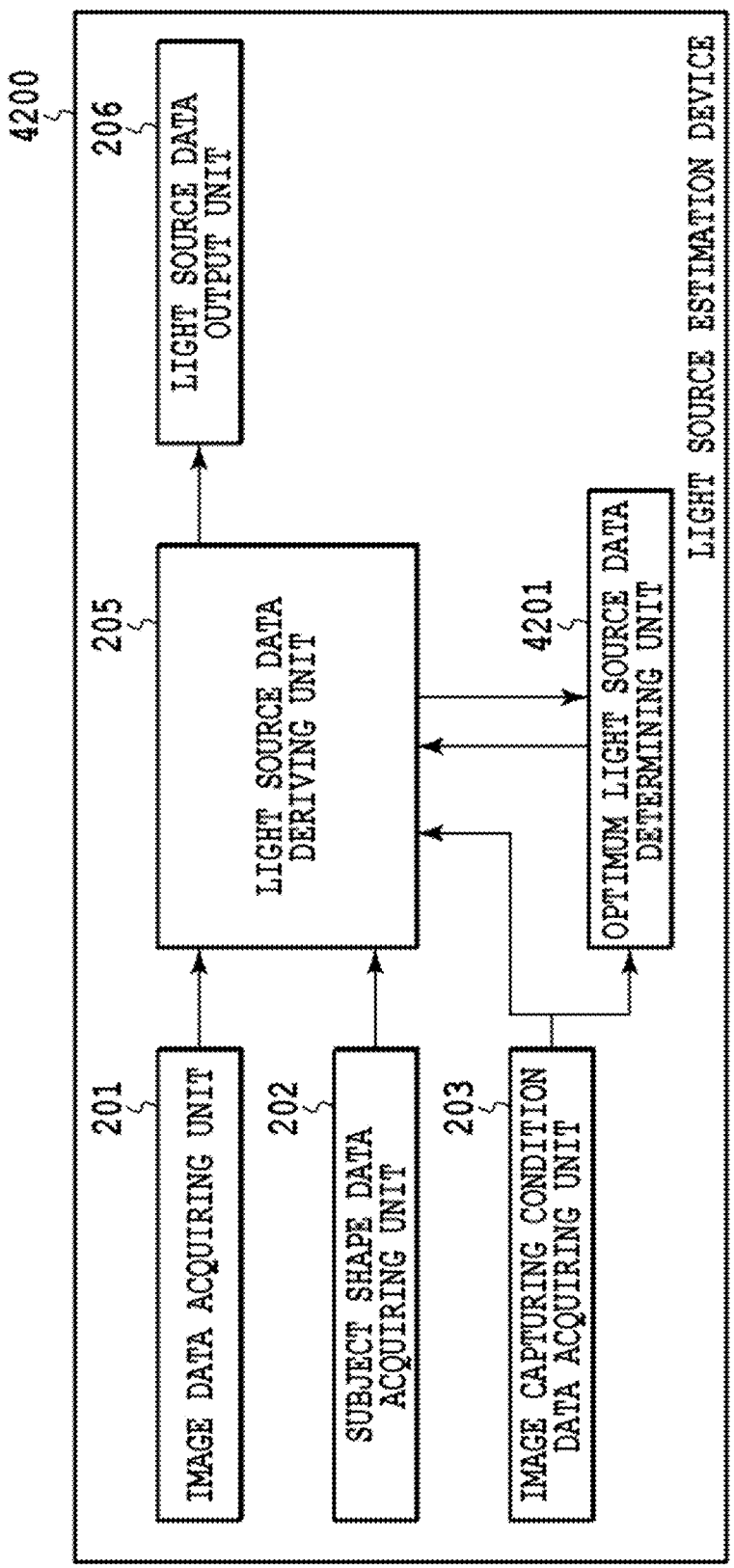
FIG. 42 is a diagram showing a system configuration example of an information processing system for performing light source estimation according to a tenth embodiment.

FIG. 42 is a diagram showing a system configuration example of an information processing system for performing light source estimation according to the present embodiment. A light source estimation device 4200 is a PC etc. and substantially corresponds to the light source estimating unit 114 in the first embodiment. The light source estimation device 4200 according to the present embodiment includes an optimum light source data determining unit 4201. The optimum light source data determining unit 4201 determines one piece of light source data based on image capturing condition data from a plurality of solution candidates derived by the light source data deriving unit 205.

Figure 43:
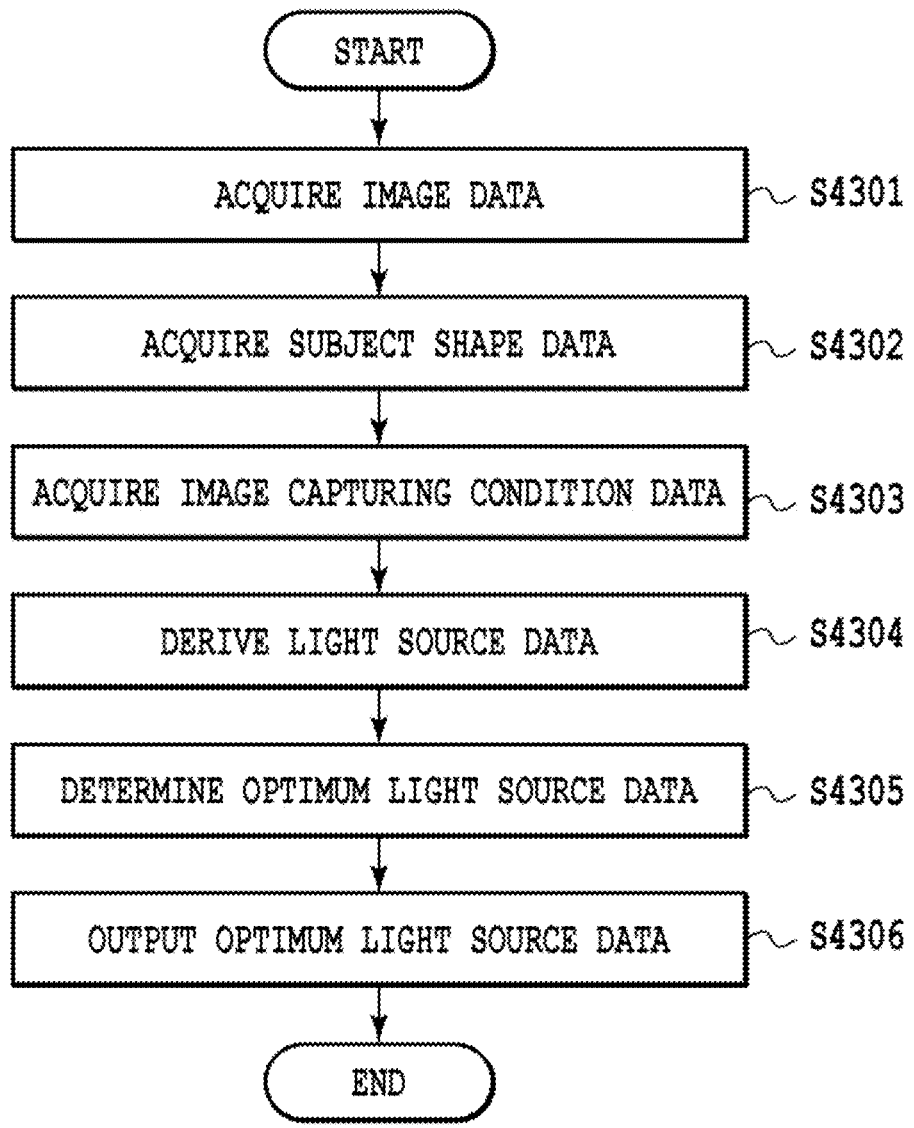
FIG. 43 is a flowchart showing a flow of light source estimation processing in the tenth embodiment.

FIG. 43 is a flowchart showing a flow of light source estimation processing in the present embodiment.

At step 4301, the image data acquiring unit 201 of the light source estimation device 4200 acquires image data having been subjected to predetermined image processing from a camera etc., not shown schematically. The acquired image data is sent to the light source data deriving unit 205.

At step 4302, the subject shape data acquiring unit 202 of the light source estimation device 4200 acquires subject shape data from an HDD (not shown schematically) etc. in which subject shape data is stored.

At step 4303, the image capturing condition data acquiring unit 203 of the light source estimation device 4200 acquires image capturing condition data from a camera etc., not shown schematically. The acquired image capturing condition data is sent to the light source data deriving unit 205.

At step 4304, the light source data deriving unit 205 derives light source data based on the subject shape data. An estimation algorithm used at this time derives a plurality of solution candidates. For example, in the case where solutions are found by updating light source data as described in the formula (3), for example, it can be thought to use the genetic algorithm. In this case, a plurality of solutions is searched for and each of the solutions is a solution candidate of light source data.

At step 4305, from the plurality of solution candidates obtained at step 4304, one solution candidate is determined as optimum light source data. This determination makes use of, for example, light source data described in FIGS. 7A to 7D. The optimum light source data determining unit 4201 determines a solution candidate closest to the light source data described in FIG. 7A as optimum light source data from the plurality of solution candidate for the data of an image captured with the WB (cloudy). At the time of the determination of the closest solution candidate, a squared error is determined as an evaluation value.

At step 4306, the optimum light source data determined at step 4305 is output.

As described above, in the present embodiment, in the case where a plurality of solution candidates is found in the calculation of light source estimation, it is made possible to determine one piece of light source data using image capturing condition data.

In the present embodiment, one solution candidate is selected as optimum light source data from a plurality of solution candidates of light source data; however, for example, it may also be possible to assign an appropriate weight to each of the plurality of solution candidates and add them. That is, it is made possible to derive more preferred optimum light source data by determining a weight coefficient based on image capturing condition data and adding the plurality of solution candidates.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-108822, filed May 10, 2012, and 2013-022565, filed Feb. 7, 2013, which are hereby incorporated by reference herein in their entirety.

What is claimed is:

1. An information processing device comprising:
an image capturing condition data acquiring unit configured to acquire image capturing condition data at the time of capturing an image of a subject;
a shape data acquiring unit configured to acquire shape data which represents shape of the subject;
a determining unit configured to determine an initial value at the time of estimating the light source based on the image capturing condition data; and
a light source data deriving unit configured to derive light source data, which represents a state of a light source of an image represented by the data of the captured image, based on the image capturing condition data,
wherein the light source data deriving unit performs rendering using shape data acquired by said shape data acquiring unit, and derives light source data suitable to the captured image based on an error between an image obtained by the rendering and the captured image.

2. The information processing device according to claim 1, wherein the light source data deriving unit derives light source data with which the error between an image obtained by the rendering and the captured image becomes smaller than a threshold value as light source data suitable to the captured image.

3. The information processing device according to claim 1, wherein the light source data corresponding to the image capturing condition data is determined by referring to a light source data table including a plurality of pieces of light source data associated with image capturing condition data.

4. The information processing device according to claim 3, wherein each piece of light source data included in the light source data table is specified by a value which represents luminance for each incidence direction of light incident on a subject.

5. The information processing device according to claim 4, wherein the light source data table includes an evaluation for precision of each piece of light source data.

6. The information processing device according to claim 1, further comprising
an exclusionary region determining unit configured to determine a specific region within the captured image as an exclusionary region not used for light source estimation,
wherein the light source data deriving unit finds an error from an image obtained by the rendering using a pixel region, which is the entire pixel region of the captured image from which the exclusionary region is excluded, and derives light source data suitable to the captured image based on the error that is found.

7. The information processing device according to claim 1, further comprising an exclusionary region determining unit configured to determine a specific region within the captured image as an exclusionary region not used in light source estimation based on an image obtained by performing rendering using shape data of a subject within the captured image,
wherein the light source data deriving unit finds an error between the captured image and an image obtained by the rendering, using a pixel region which is the entire pixel region of the captured image from which the exclusionary region is excluded, and derives light source data suitable to the captured image based on the error that is found.

8. A camera including the information processing device according to claim 1.

9. An information processing method comprising the steps of:
acquiring image capturing condition data at a time of capturing a subject;
inputting acquired shape data which represents shape of the subject to a information processing device;
determining an initial value at the time of estimating the light source based on the image capturing condition data;
rendering a subject image using the acquired shape data; and
deriving light source data, which represents a state of a light source of an image represented by the captured image, based on the image capturing condition data and the shape data,
wherein the light source data deriving unit derives light source data suitable to the captured image based on an error between an image obtained by the rendering and the captured image.

10. A non-transitory computer readable storage medium storing a program for causing a computer to perform an information processing method comprising the steps of:
acquiring image capturing condition data at a time of capturing a subject;
inputting acquired shape data which represents shape of the subject to a information processing device;
determining an initial value at the time of estimating the light source based on the image capturing condition data;
rendering a subject image using the acquired shape data; and
deriving light source data, which represents a state of a light source of an image represented by the captured image, based on the image capturing condition data and the shape data,
wherein the light source data deriving unit derives light source data suitable to the captured image based on an error between an image obtained by the rendering and the captured image.

* * * * *